(12) United States Patent
Gueron et al.

(10) Patent No.: US 8,463,246 B2
(45) Date of Patent: Jun. 11, 2013

(54) CONTACT MANAGEMENT

(75) Inventors: Ivan Gueron, Los Angeles, CA (US); Gurvinder Singh, Redondo Beach, CA (US); Jamie Hilao, Canoga Park, CA (US); Jeffrey Lane, Los Angeles, CA (US); Anna Mijares, San Pedro, CA (US); Srinivasan Subramaniam, Culver City, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 234 days.

(21) Appl. No.: 12/788,183

(22) Filed: May 26, 2010

(65) Prior Publication Data
US 2010/0304725 A1 Dec. 2, 2010

Related U.S. Application Data

(60) Provisional application No. 61/181,234, filed on May 26, 2009.

(51) Int. Cl.
*H04W 4/00* (2009.01)
(52) U.S. Cl.
USPC .................................. 455/414.1; 707/621
(58) Field of Classification Search
USPC ................. 455/418, 414.1; 707/621, 802
See application file for complete search history.

(56) References Cited

U.S. PATENT DOCUMENTS

| 7,026,925 | B2 | 4/2006 | Roche et al. | |
| 7,363,053 | B2 | 4/2008 | Dalton et al. | |
| 2002/0120462 | A1 | 8/2002 | Good | |
| 2004/0236792 | A1 | 11/2004 | Celik | |
| 2009/0222838 | A1 | 9/2009 | Ho | |
| 2009/0265794 | A1 | 10/2009 | Apelqvist | |
| 2010/0042941 | A1 | 2/2010 | Vance et al. | |
| 2011/0218963 | A1* | 9/2011 | Dun et al. | 707/625 |
| 2012/0021733 | A1* | 1/2012 | Lin et al. | 455/418 |

OTHER PUBLICATIONS

Criticall, "RollCall: Product Overview," Criticall Limited, 2005, 16 pages.

* cited by examiner

*Primary Examiner* — Phuoc Doan
(74) *Attorney, Agent, or Firm* — Procopio, Cory, Hargreaves & Savitch LLC

(57) ABSTRACT

A contact management system including: a computer in communication with a central database and a mobile device configured to communicate with the central database, wherein the mobile device includes a contact management module that interfaces with a wireless network to allow a user of the mobile device to access contact information in the central database, the contact management module configured to provide synching of contact information within the mobile device with the contact information in the central database.

9 Claims, 65 Drawing Sheets

FIG. 6

| Name | Title | Company | Phone |
|---|---|---|---|
| Alex Smith | | The | |
| Alicia Smith | | Smith | 202-6 |
| Barry Smith | | | |
| Ben Smith | | | |
| Bob Smith | | Duk | 212-7 |
| Brooke Smith | | | 212-8 |
| Chris Smith | | Metr | 44-17 |
| Ethel Smith | | | |
| Fay Smith | | | |
| Gary Smith | | Inton | 44-20 |
| Gavin Smith | | | 212-8 |
| Graham Smith | | | 212-8 |
| Jennifer Smith | | | |
| Jonah Smith | | Thou | 323-9 |
| Jordan Smith | | Sony | 310-2 |
| Katie Smith | | Mads | 212-9 |
| Kermit Smith | | Key f | 39-06 |
| Kevin Smith | | | 323-9 |
| Kevin Smith | | | |
| Kevin Smith | | | 323-9 |
| Lois W. Smith | | | |
| Lorry Smith | | Winc | 44-20 |
| Lucil Smith | | Sbir | 212-2 |
| Marcus Smith | | | |

| Company | City | Phone | Website |
|---|---|---|---|
| 11:24 Design | sit city , ny | | |
| 11th Hour Productions & Entertainment | | | |
| 149 Wooster | New York , NY | 213- | www.m |
| 15 Minutes PR | New York , NY | | www.14 |
| 150 Photographers | dummy city , DE | | |
| 20th Century Fox | Los Angeles , CA | | |
| 21st Century Artists, Inc. | New York , NY | 824- | |
| 24/7 Pictures | New York , NY | | |
| 2929 Entertainment | Santa Monica , CA | | |
| 2929 International | Beverly Hills , CA | 213- | |
| 3 Arts Entertainment | New York , NY | | |
| 3 Strange Angels | | | |
| 31 Heroes | Bakersfield , CA | | |
| 33 Gold | Culver , CA | | |
| 4 Productions | | | |
| 40 Acres and a Mule Filmworks | | | |
| 42West | New York , NY | | |
| 42nd Street Productions | | | |
| 5108 Post Production | Hollywood , CA | | |
| 52mm/product52 | New York , NY | | |
| A Film | | | |
| A.M.C. | Woodland Hills , CA | | |
| A Pix | | | |
| A Vent Chez Henri | | | |
| A&E Television | City | | |

Viewing Page 1 of 158 >>

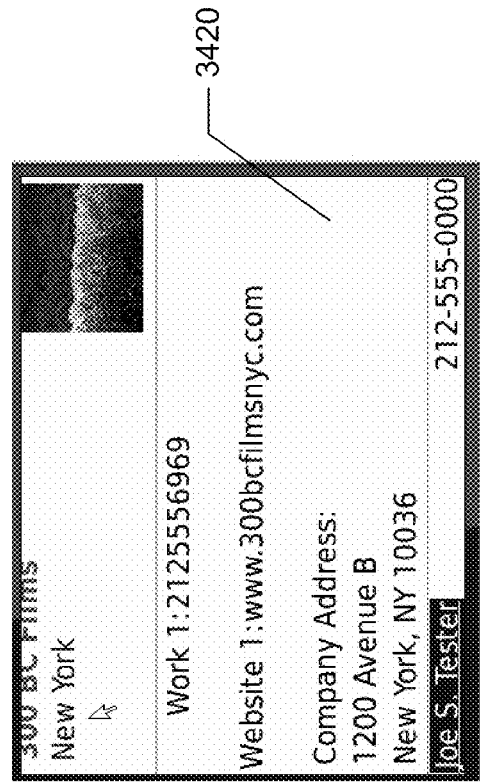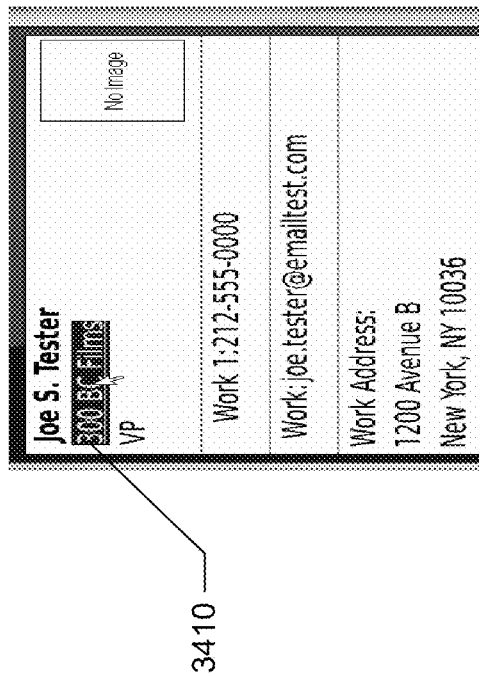
FIG. 34

CONTACT MANAGEMENT

CROSS-REFERENCE TO RELATED APPLICATIONS

This application claims the benefit of priority of U.S. Provisional Patent Application No. 61/181,234, filed May 26, 2009, entitled "Contact Management." The disclosure of the above-referenced provisional application is incorporated herein by reference.

BACKGROUND

In a conventional system, contact information for a collection of users may be stored in multiple individual databases. The information and updates may then need to be re-entered to be transmitted to other users and/or to smartphones, PDAs, and other similar devices of users. Similarly, call management and history may be handled with individual databases and spreadsheets, resulting in lost opportunities to track and report on call data.

SUMMARY

Implementations of the present invention include integrated components for mobile and web access, providing a more unified system. The same information is accessible and updated through tools that can be used by a user at a desktop/notebook computer and through a mobile device, such as a smartphone or PDA (e.g., a BlackBerry™ device).

In one implementation, a contact management method includes: entering contact information in a computer in communication with a central database; storing the contact information in the central database; and enabling a user on a mobile device to access the contact information and make modifications to the contact information. The contact information on mobile device and in the computer may be periodically synched with the central database so that modifications made on the mobile device are saved in the central database.

In another implementation, a contact management system includes: a computer in communication with a central database, wherein the central database stores contact information; and a mobile device configured to communicate with the central database. The mobile device may include: a contact management module that interfaces with a wireless network to allow a user of the mobile device to access contact information in the central database, the contact management module configured to provide synching of contact information within the mobile device with the contact information in the central database.

In another implementation, a computer-readable storage medium storing a computer program for accessing contact information on a central server is disclosed. The program includes executable instructions that cause a mobile device processor to: access the contact information from the central database over a wireless network; perform one or more modifications to the contact information on the mobile device; and transmit any modifications made to the contact information on the mobile device to the central server.

In another implementation, an apparatus includes a contact entry generation module to create a contract entry; and an entry updating module to edit information for existing contact entries; wherein the apparatus is in communication with a central database, the central database being configured to store contact entry information.

In yet another implementation, an information management system includes: a computer in communication with a central database, the central database being configured to store contact and call log information; and a mobile device configured to communicate with the central database. The computer may include a mobile device interface module for communicating with the mobile device and a contact management component for processing contact and call log information transmitted from the mobile device. The mobile device may include a contact management module that interfaces with a wireless network to allow a user of the mobile device to access contact information in the central database.

BRIEF DESCRIPTION OF THE DRAWINGS

FIGS. 5-10 illustrate various user interfaces (UIs) for creating/editing contacts in the web application module in accordance with implementations of the present invention.

FIGS. 11-18 illustrate various user interfaces (UIs) for creating/editing companies in the web application module in accordance with implementations of the present invention.

FIG. 19 illustrates a user interface (UI) having a callsheet tab in a web application module in accordance with implementations of the present invention.

Figure 21:
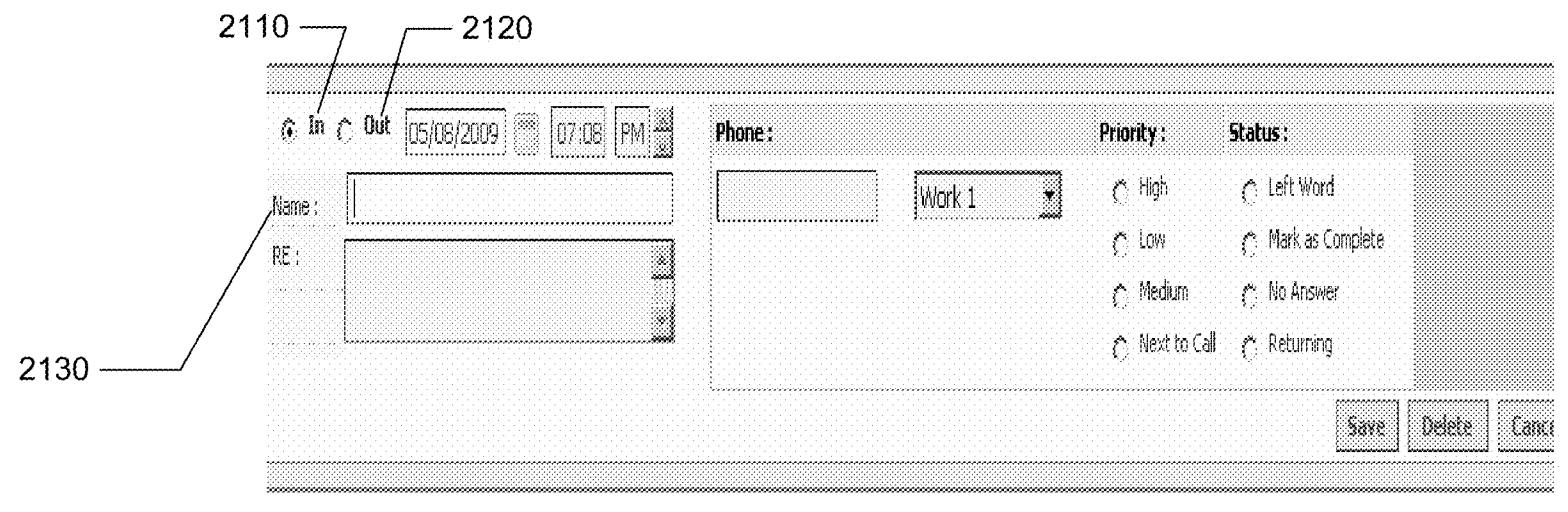

FIGS. 20-25 illustrate various user interfaces (UIs) for creating/editing callsheets in the web application module in accordance with implementations of the present invention.

FIGS. 30-44 illustrate various user interfaces (UIs) for creating/editing/searching contacts in the mobile device application module in accordance with implementations of the present invention.

FIGS. 45-52 illustrate various user interfaces (UIs) for creating/editing/searching companies in the mobile device application module in accordance with implementations of the present invention.

DETAILED DESCRIPTION

Figure 1:
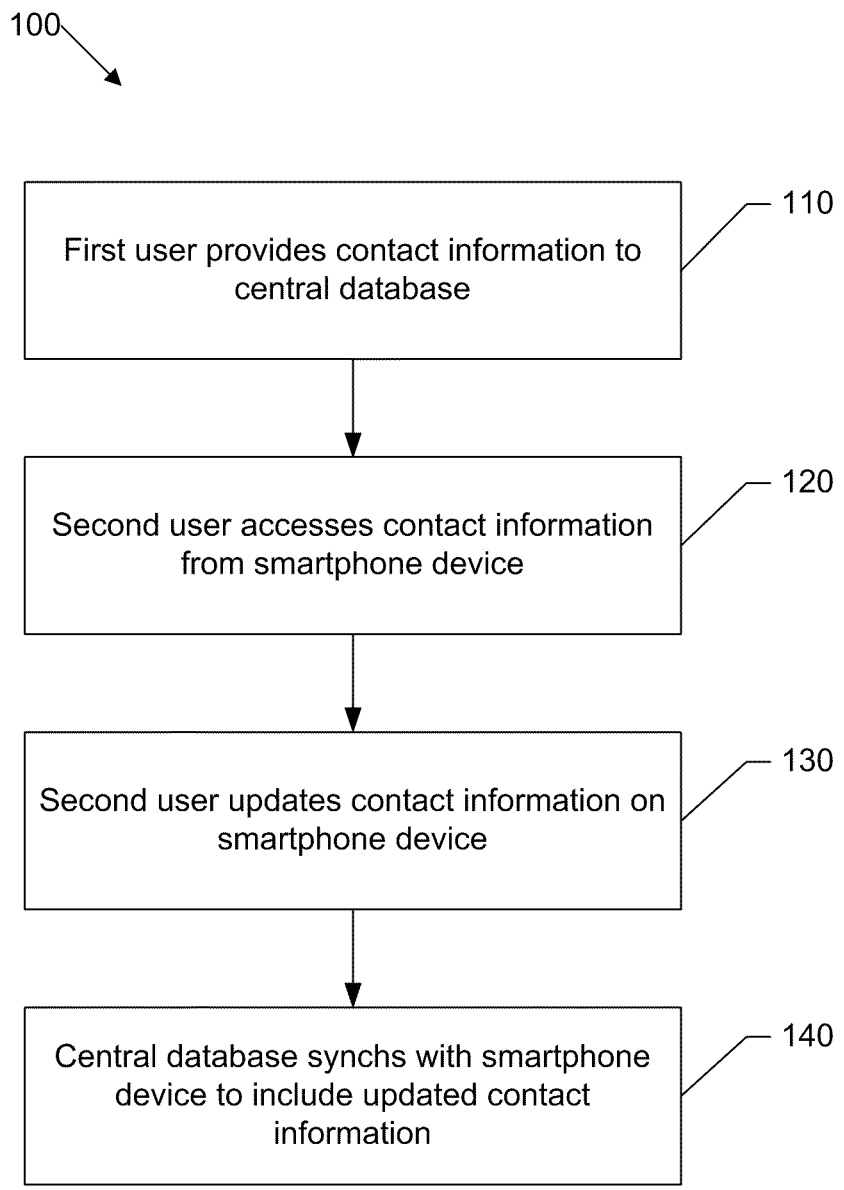
FIG. 1 shows a flow chart of a method illustrating synching functionality between one or more mobile devices and a central database in accordance with one implementation of the present invention.

Embodiments of the present invention provide for implementing contact management. In one implementation, a contact management system includes smartphone and web components. Contact management systems provide an integrated solution having improved efficiency and storage solutions rather than having multiple stand-alone components that must be updated manually.

Examples of objectives for an implementation can include, but are not limited to, one or more of the following: (1) Utilize centralized contact management database accessible internally with an e-mail/personal information management product (e.g., Microsoft Outlook) and externally via web-based and mobile device (e.g., PDA); (2) Provide ability to have private and public contact information; (3) Two-way push synching web and PDAs; (4) Utilize database to extract necessary data for email blasts as needed; (5) Provide framework to integrate instant messaging call management—automating callsheet entry and data capture; (6) Track calls in their various stages of completion, allowing executive easy access to calls still needing attention; and (7) "Screen-Pop" auto lookup of Incoming/Outgoing calls in database; and iPhone integration.

To achieve the above-listed objectives, various plans have been implemented. For example, in a first phase of development, contact entry and two-way data synching were implemented. In a second phase of development, instant messenger ("IM")-like functionality that rolls into call logging/tracking were implemented. Example components of the plan included: (1) Plan and execute the necessary steps for converting existing contact data; (2) Develop mobile contact application; (3) Provide mechanism to allow two-way data synch between web app and PDA's; (4) Email update/blast integration; (5) Complete component, integration, and system tests of the developed application; (6) Instant Message integration; (7) CallSheet Implementation; (8) Automated lookup of incoming/outgoing calls in database; and (9) iPhone mobile contact application.

After reading this description it will become apparent how to implement the invention in various alternative implementations and alternative applications. However, although various implementations of the present invention will be described herein, it is understood that these implementations are presented by way of example only, and not limitation. As such, this detailed description of various alternative implementations should not be construed to limit the scope or breadth of the present invention.

Features provided in implementations can include, but are not limited to, one or more of the following items: full-featured smartphone or PDA and web solutions to manage contacts for people and companies; automated two-way data synch between the web app and PDAs; automated e-mail maintenance update system to help keep contact information up to date; a call sheet module for call management, which includes a call log and allows end users to track the status of calls; and contact management by groups and the ability to limit access to each group of contacts as well as fields within a particular contact through a robust security framework.

In one implementation for designing an integrated hardware system, users are allowed to access the same contact information on remote telecommunications devices or on stationary devices. A method 100 illustrating such an example is provided in FIG. 1. A first user provides contact information, at block 110, to a central database (e.g., at or connected to one or more network servers) through a web application executed on a computer system in an office. Various types of contact information can be stored, such as name, phone number(s), email address(es), company information, notes, etc.

A second user then accesses, at block 120, the contact information provided by the first user from a remote telecommunication device such as a smartphone device. In block 130, the second user may update contact information on the smartphone. The web application updates or performs a synch, at block 140, to include the updated contact information in the central database.

Additionally, in some implementations, when the second user places a call with the smartphone, using the contact information on the smartphone, the call information is logged (e.g., a call log) and sent to the central database. The call log may be available at both the smartphone and through the web application.

Various types of call information may be stored in the call log, such as contact, time, call length, call result (e.g., "no answer," "voicemail," "follow-up," "complete"), notes, etc. Appointment or schedule information may also be stored. This information may be used by the first and second user to coordinate scheduling, such as which calls have been and need to be made, or suggested priority. In this way both the first and second user can access synchronized information reflecting contact information and contact history/tracking.

Figure 2:
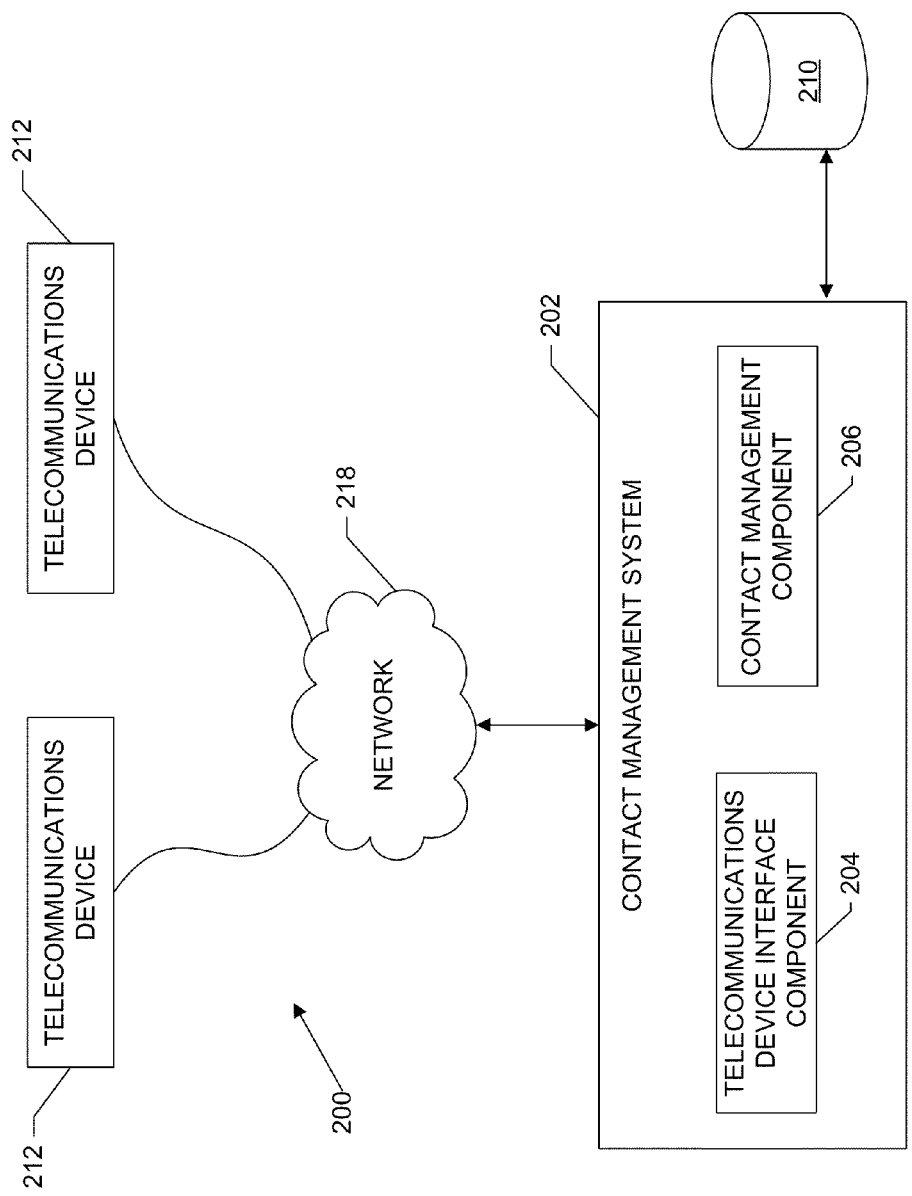
FIG. 2 shows a block diagram illustrative of a telecommunications or wireless environment for managing user contacts in accordance with one implementation of the present invention.

With reference now to FIG. 2, a block diagram illustrative of a telecommunications or wireless environment 200 for managing user contacts will be described. The telecommunications environment 200 may include a contact management system 202. As illustrated in FIG. 2, the contact management system 202 may include a telecommunications device interface component 204 for establishing communications with a variety of telecommunications devices. In an illustrative embodiment, the telecommunications device interface component 204 corresponds to a bi-lateral interface for facilitating the transfer of data between telecommunications devices and the contact management system 202. In particular, in one embodiment, the telecommunications device interface component 204 obtains telecommunications device information and user event information from a variety of telecommunications devices.

With continued reference to FIG. 2, the contact management system 202 may also include a contact management component 206 for processing the telecommunications device information and user event information, particularly with respect to telecommunications device user contacts and communications therewith. The contact management system 202 may further be associated with a contact management data store 210 for storing information obtained by the interface component 204 and/or utilized by the contact management component 206.

One skilled in the relevant art will appreciate that the contact management system 202 may correspond to a number of computer devices, such as server computing devices. Additionally, the telecommunications device interface component 204 and contact management component 206 may be implemented in a single computing device or across multiple computing devices. Likewise, although the contact management data store 210 is illustrated as local to the contact management system 202, the data store 210 may correspond to a distributed data store and/or network-based data store. One skilled in the relevant art will also appreciate that the contact management system 202 may include any one of a number of additional hardware and software components that would be utilized in the illustrative computerized network environment to carry out the illustrative functions of the system 202 and/or any of the individually identified components.

The telecommunications environment 200 can also include a number of mobile devices 212. The mobile devices 212 may correspond to a wide variety of devices or components that are capable of initiating, receiving, or facilitating communications over a communication network 218 including, but not limited to, personal computing devices, hand held computing devices, integrated components for inclusion in computing devices, home electronics, appliances, vehicles, machinery, landline telephones. VoIP telephones, cordless telephones, cellular telephones, smart phones, modems, personal digital assistants, laptop computers, gaming devices, media players, and the like.

Figure 3:
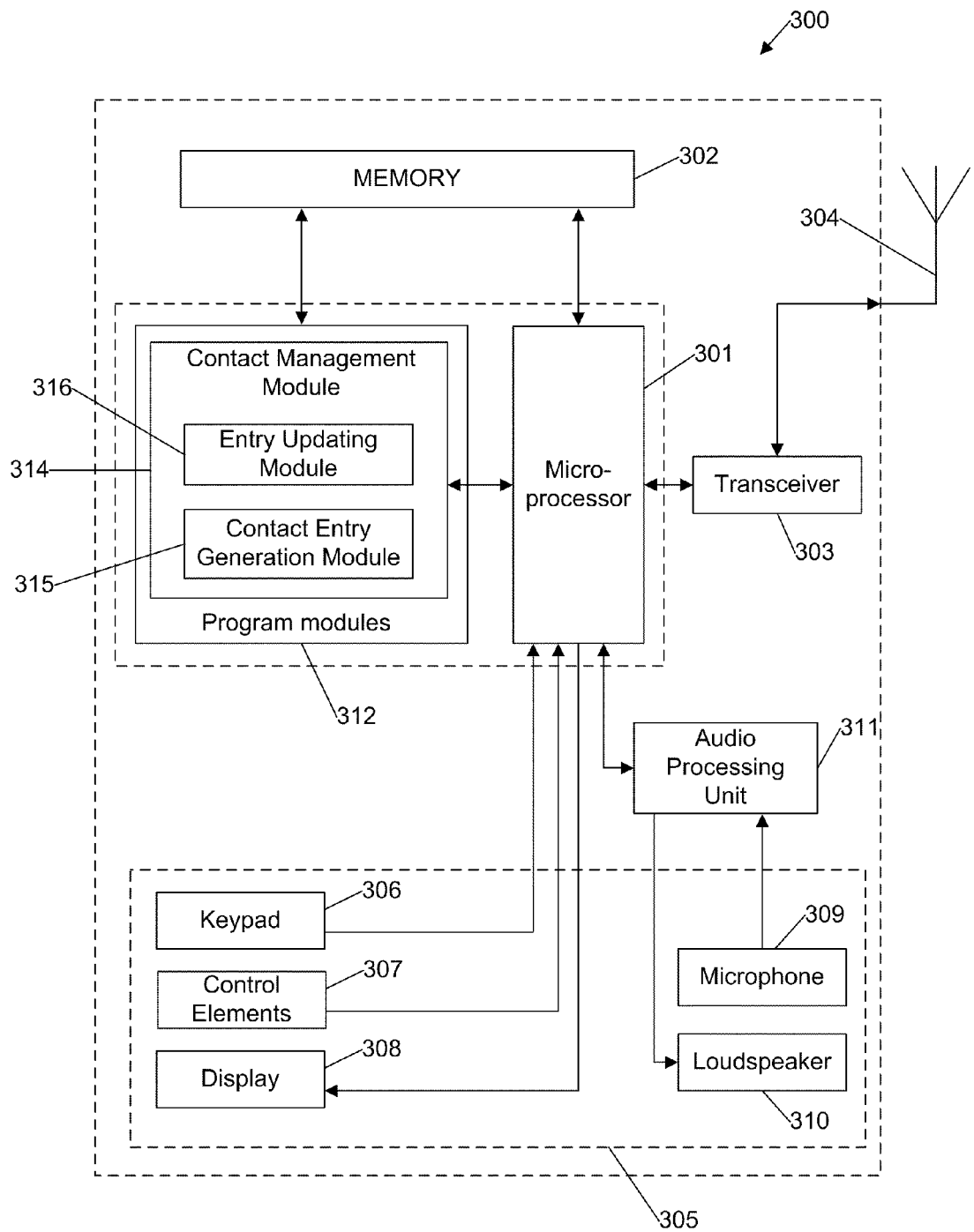
FIG. 3 shows a schematic diagram of a mobile device in accordance with one implementation of the present invention.

Referring to FIG. 3, a schematic diagram of a mobile device 300 according to an embodiment of the invention is shown. The device 300 includes a processor 301, e.g., a microprocessor, which interfaces with several components of the mobile device 300, e.g., by an input/output unit (not shown). Exchange of control signals or data between the components may be achieved by a bus system. The processor 301 can control the operation of the device 300, according to programs stored in memory 302. Processor 301 may be implemented as a single processor or as multiple processors, in the form of a general purpose or special purpose processor, or digital signal processors. Memory 302 may comprise all forms of memory, such as random access memory (RAM), read only memory (ROM), non volatile memory such as EPROM or EEROM, flash memory or hard drive. Some of these types of memory may be removable from the device 300, e.g. flash memory cards, while others may be integrated for example with processor 301.

Transceiver 303 is functionally connected to antenna 304 for receiving and sending out electromagnetic signals. Transceiver 303 is a fully functional cellular radio transceiver and can be used to establish a cellular phone connection to a subscriber or to transmit short messages or data through a mobile telephony or wireless network. The transceiver 303 may operate according to any known standard, comprising standards known as the global system for mobile communications (GSM), CDMA, etc. Transceiver 303 may also operate according to other standards, for example for exchanging data, such as a GPRS standard, wireless local area network standards (e.g., IEEE802.11G), a wireless personal area network standard (IEEE802.15), or any bluetooth standard, such as Bluetooth 2.1. Transceiver 303 may thus comprise different circuits for mobile communication and for data exchange, and may interface more than one antenna.

The device 300 further includes a user interface 305. The user interface 305 includes a keypad 306, control elements 307, a display 308, a microphone 309 and a loudspeaker 310. Display 308 may be used to display information, function menus and the like to a user of the device 300. Display information may include a picture or image, service information, contact information, internet-related information and other information that is to be presented to a user of device 300. Keypad 306 may be used to enter text or digits, and includes alphanumeric keys, menu keys and the like. Control elements 307 can include additional elements for controlling device 300, such as a turn-push-button, joystick-like control elements, a mouse or a trackball, a rotary switch, rocker and the like. Depending on the implementation of the device 300, the user may use the keypad and the control elements to bring up a menu on display 308, to select and execute functions, to enter and dial a telephone number, or to compose an e-mail or short message and initiate its transmission.

Microphone 309 and loudspeaker 310 interface with audio processing unit 311. Microphone 309 may record a voice signal of a user, and audio processing unit 311 may convert such a signal to a digital signal and provide it to processor 301, e.g. through an input/output unit. Similarly, a sound signal that is to be output to the user such as the voice signal received during a telephone conversation, may be provided directly or via micro processor 301 to audio processing unit 311. Audio processing unit 311 may convert such a signal to an analogue signal which is then output by speaker 310. Microphone 309 and loudspeaker 310 may, for example, be used to communicate with another person by mobile telephony or Voice-over-IP telephony. Other functions may include the playback of a soundfile stored in memory 302, or the activation of a function via voice control.

Device 300 further includes program modules 312. Program modules 312 may, for example, be implemented as instructions running on processor 301. The program modules 312 may include a contact management module 314.

As shown in FIG. 3, contact management module 314 includes a contact entry generation module 315 and an entry updating module 316. Contact entry generation module 315 generates contact entries. Such generation may be initiated by a user of device 300. More particularly, a user may perform operations that create a contact entry. These operations may include the user commencing a contact entry generation process, the user entering data associated with the contact entry, and the user saving the generated contact entry. Such operations may involve the user interacting with user interface 305.

Entry updating module 316 receives updated information for contact entries. Such information may be received from input supplied by the user of device 300 via user interface 305.

Alternatively, entry updating module 316 may generate request messages that request information (e.g., data or user contact information) from contact management system 202 (shown in FIG. 2). In response, entry updating module 316 may receive response messages from contact management system 202 that provides the requested information. For example, device 300 may receive a proposed contact entry message from central management system 202. Upon receipt, the user (through user interface 305) may view the proposed contact entry and determine whether to store it.

In some embodiments, entry updating module 316 provides synchronization of contact information in the mobile device 300 with contact information in the contact management system 202. In an example embodiment, the entry updating module 316 may be implemented as software or a software utility downloadable over the internet.

In some embodiments, the contact management module 314 may be operative to provide user contact information to the contact management system 202 As discussed above, contact management system 202 includes a contact management component 206, which may provide for synchronization of contact information in the contact management system 202 with the contact information in the mobile device 300.

It should be clear that FIG. 3 shows only an illustrative example and that some of the components shown are not necessary in other embodiments of the invention. If implemented as an internet server, the device 300 does not need to comprise an audio processing unit, a microphone, and a loudspeaker, for example, and does not need to be provided with a keypad, control elements and a display. In such an embodiment, the antenna 304 may be substituted with a connector for connecting to a computer network.

Web Application Contacts and Callsheet Module(S)
Contacts Module

In accordance with embodiments of the present invention, once contact information is integrated into a master file, users will no longer need to maintain separate, stand-alone databases. Additionally, in some embodiments, a third party maintenance agreement will cycle through the master file with regular, scheduled updates, verify information updated by users, correct duplicate or misspelled names, and provide oversight as to quality of the table. Consequently, users will be allowed to maintain private and confidential information as they would in their own standalone application, but have it available through the web, accessible from any location. Additionally, in some embodiments, the application will be integrated to include Call Management, Instant Messaging, Contact Management, and accessibility through a PDA or mobile phone.

Figure 4:
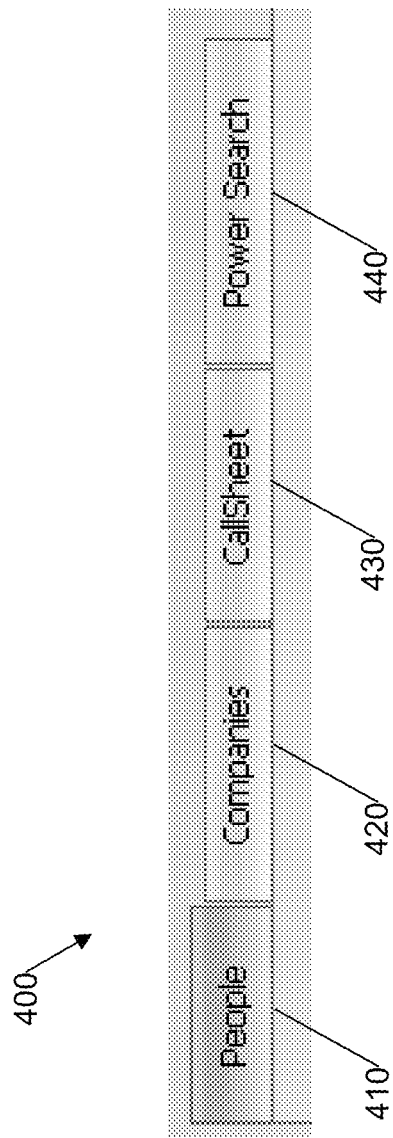
FIG. 4 illustrates a user interface (UI) having a main lookup table for contacts in a web application module in accordance with implementations of the present invention.

Referring now to FIG. 4, in accordance with an embodiment, a contacts table 400 of a contacts module is shown, which is the main lookup table for contacts and is the source of values that feed into other parts of the web application. Contacts table 400 includes four parts or tabs: People 410, Companies 420, Callsheet 430, and Power Search 440.

Upon entering the contacts module, the system displays the People tab 410 by default (shown in FIG. 5 as page 500), and default sort is by Last name, ascending. To re-sort the name or any other column, the user clicks on the column header. In some embodiments, the 'Phone' column is not sortable.

In accordance with some embodiments, the People tab 410 is where a contact person's information is created, maintained, and stored. Its default sort is by last name, ascending. To re-sort this or any other column, the user clicks on the column header. Clicking once reverses the sort and clicking once more reverts back to its original sort.

Figure 6:
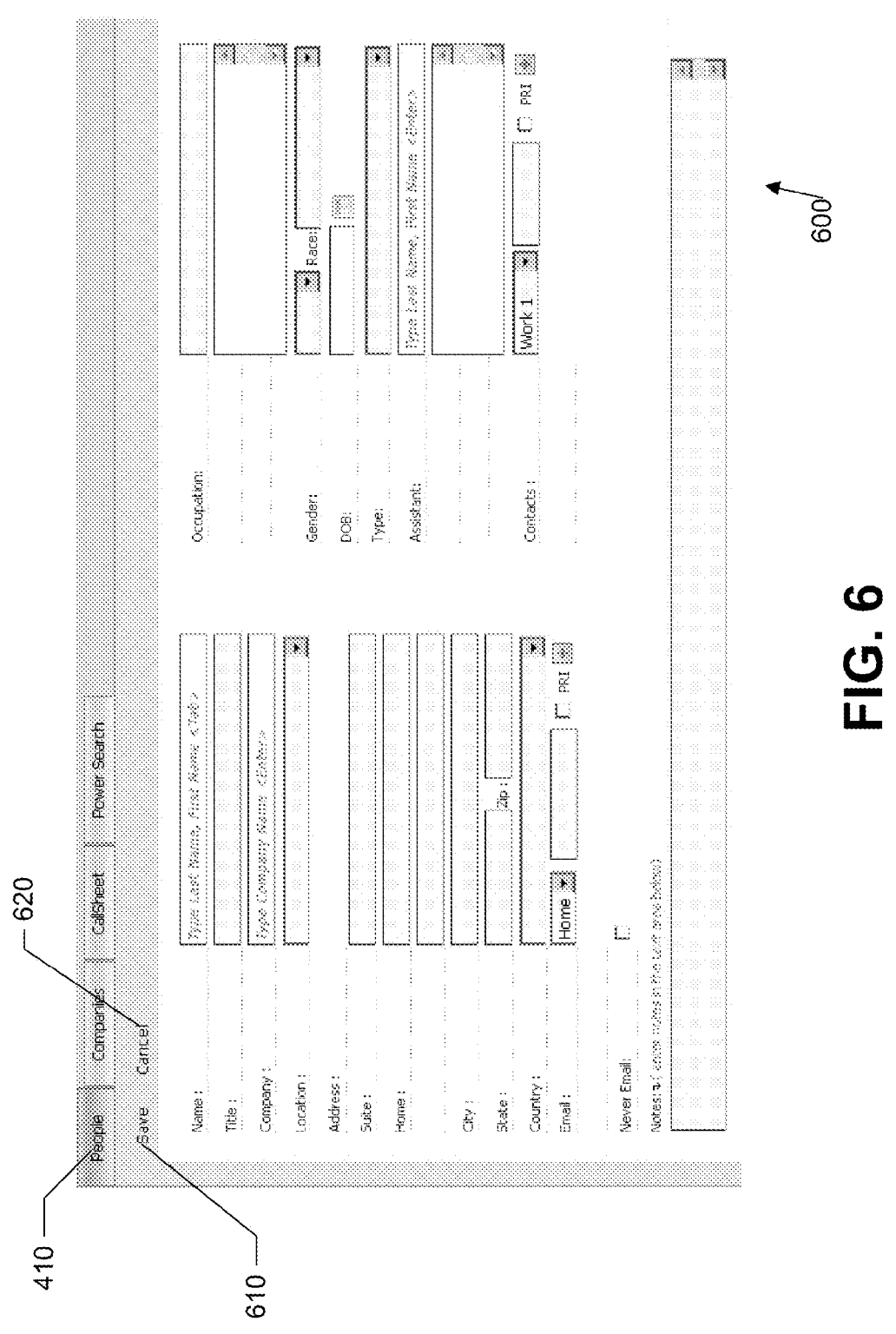
Figure 6A:
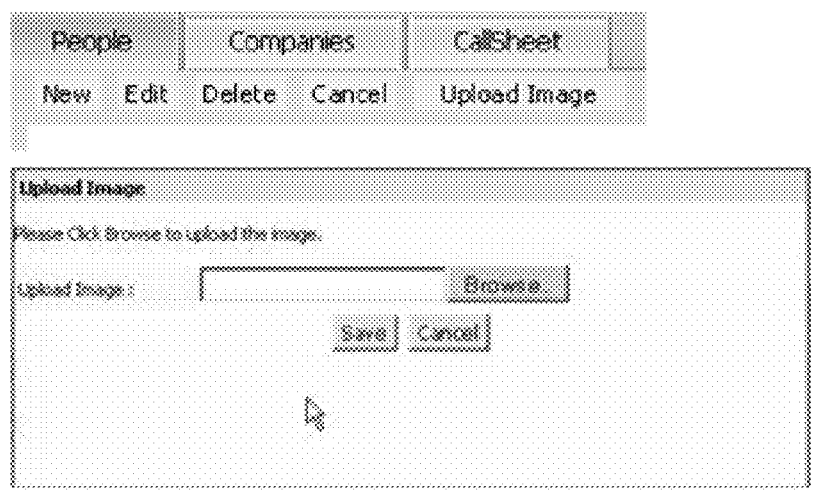

In a first example, to create a new people record, the user clicks on the 'New' link 510 located below the 'People' tab 410. Thereafter, the new record form 600 (shown in FIG. 6) displays and is ready for data entry. The user may then begin entering values for the listed fields on the screen 600. The user can use the tab key to move from one field to the next.

In the illustrated example of the new record form 600, the following fields are included:

(1) Name: To be entered in the format Last Name, First Name, then hit the Tab key. Text entered in any other format such as First Name [space] Last Name will be treated as a last name.

(2) Title.

(3) Company: This is a type-ahead field that allows the user to type in the first few characters of the company name, and matching values from the Companies table will begin to display. The user can then use the mouse to click on his desired value or use his arrow keys to find the company and hit Enter to select it.

(4) Location: The user makes his selection from the Location dropdown. Values for Location may be fed in from the Companies table based on the Company selected.

(5) Address: This is filtered in based on the location selected.

(6) Suite.

(7) Home Address (Street Address, City, State, Zip, Country).

(8) Email: The user makes his selection from the dropdown (Home, Office, etc.) and enters the email address in the input box. To add more entries, the user clicks on the plus sign. The user uses the 'Primary' checkbox to indicate which email address to use as the primary address. Once an email address is added, it is displayed in a grid below the field as shown. To make changes to any of the email entries, the user clicks on the entry to change, makes the appropriate changes, and clicks the blue check mark to save his change. To delete, the user clicks to select the email to delete and clicks on the red minus sign.

(9) Occupation: This is another type ahead field that allows the user to type in the first few characters and select from a list of close matches. The user can add as many occupations by repeating this process. As each entry is added, it is displayed in a grid below it. To remove, the user clicks on the red minus sign.

(10) Gender and Race: The user selects a Gender and Race from the dropdown lists.

(11) Date of Birth: The user uses the calendar widget to select.

(12) Type: The user selects a type from the dropdown list.

(13) Assistant: This is another type ahead field that allows the user to type in the first few characters and select from a list of close matches. The user can add as many selections by repeating this process. As each entry is added, it is displayed in a grid below it. To remove, the user clicks on the red minus sign.

(14) Contact Phone numbers: The user makes his selection from the dropdown (Home, Office, etc.) and enters the phone number in the input box. To add more entries, the user clicks on the plus sign. The user uses the 'Primary' checkbox to indicate which phone number to use as the primary number. Once a phone number is added, it is displayed in a grid below the field as shown. To make changes to any of the entries, the user clicks on the entry to change, makes the appropriate change, and clicks the blue check mark to save the change. To delete, the user clicks to select the email to delete and clicks on the red minus sign.

(15) Upload Image: The user clicks on the 'Browse' button to launch the standard Windows 'Choose File' dialog box. The user selects the image and clicks Open. For this implementation, see FIG. 6A for detail.

(16) Notes: The user enters his notes in the 'Notes' box.

(17) Save: The user clicks on the 'Save' link 610 to save his changes. Otherwise the user clicks the 'Cancel' link 620 to undo the changes.

In accordance with the synching function, described in the System Hardware section, newly created contact records should reflect on Mobile Device Application Module, discussed below.

Figure 5:
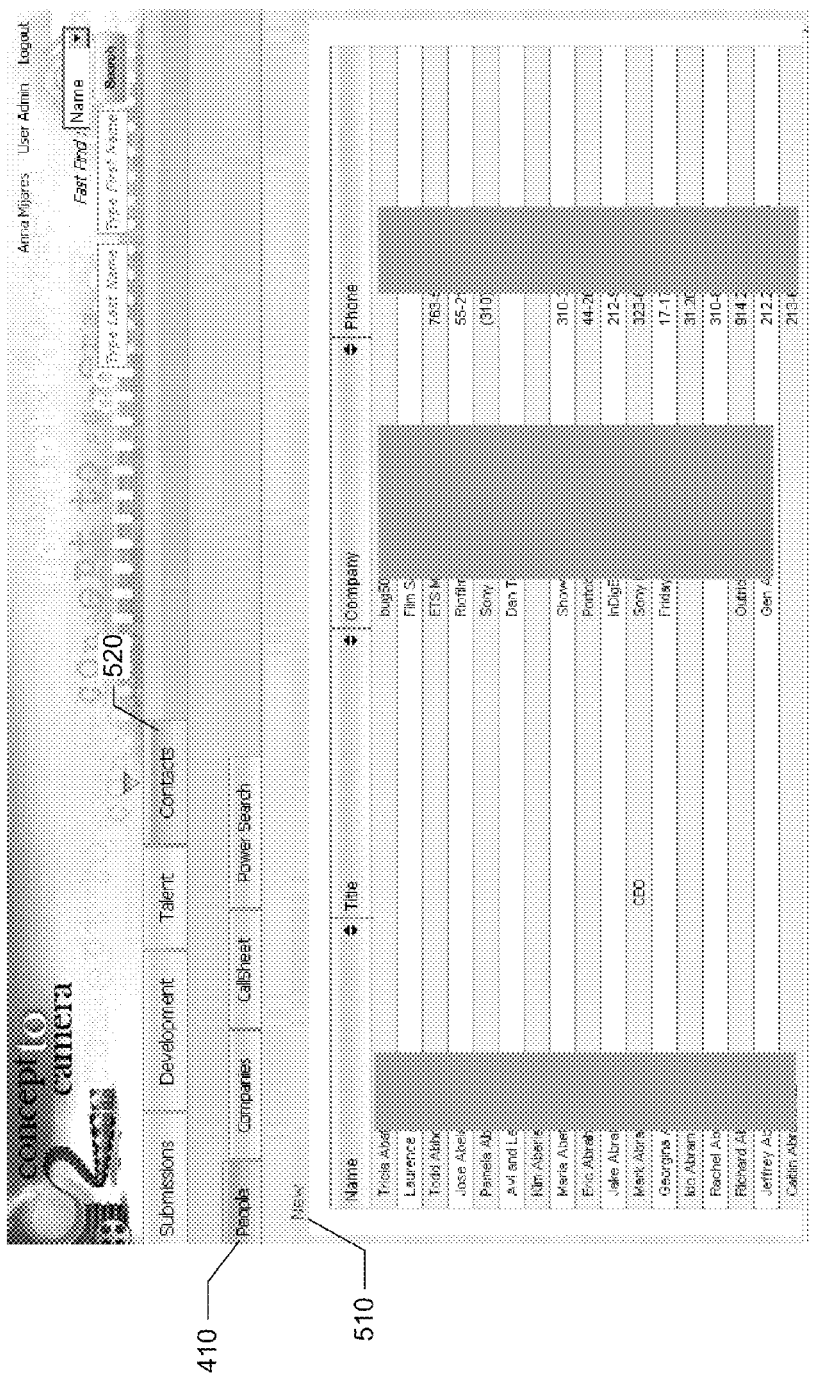

Still referring to FIGS. 4-6, in accordance with an embodiment, an example of editing an existing person record will now be described. First, from the main people screen 500 on the Contacts tab 520, the user scrolls to find the desired entry to edit. Next, the user clicks on the name to open up the record. The user then clicks on the Edit link (see 720 of FIG. 7). The user makes the appropriate changes, and clicks on the Save link 610 to save the changes or clicks on the Cancel link 620 to undo the changes.

In accordance with the synching function, changes to existing contact records should reflect on the Mobile Device Application Module.

Figure 7:
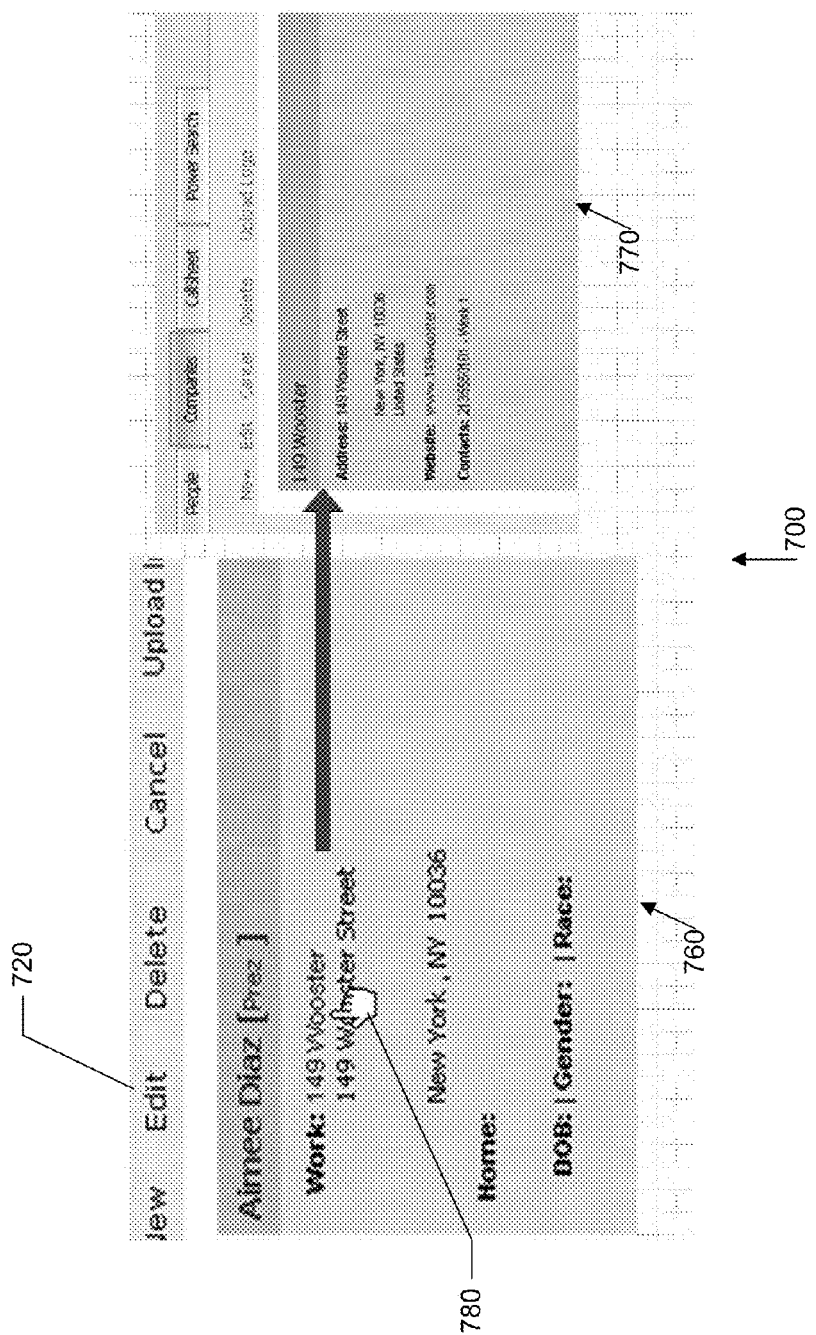

Referring now to FIG. 7, in accordance with an embodiment, linking to a company from the contact detail view will be described with reference to page 700. From within a contact record 760, as shown on page 700, a user can move to a company detail view 770 by clicking on the company link 780 tied to the contact.

Figure 8:
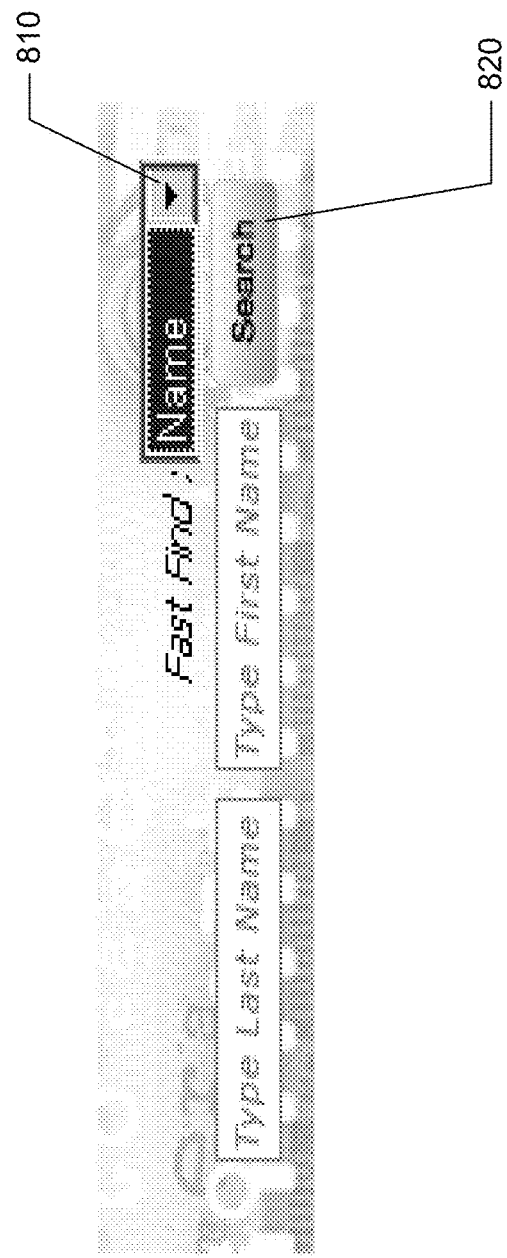
Figure 9:
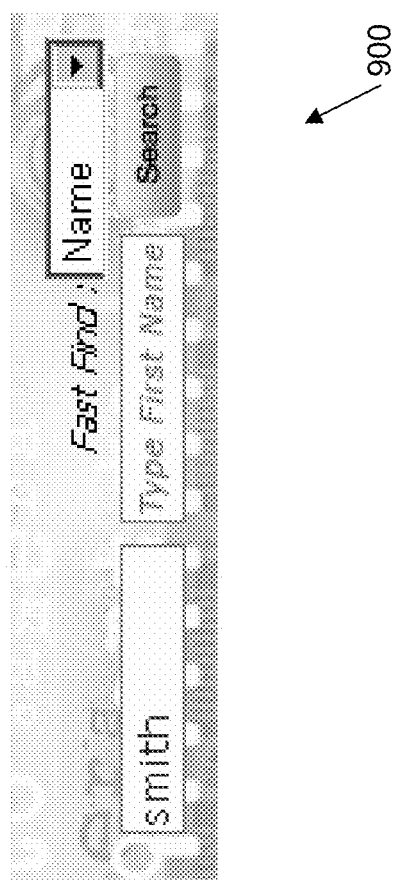

Referring now to FIGS. 8-10, the people tab 410 may include a fast find option (e.g., dropdown 810) as shown on pages 800, 900 and 1000 (FIGS. 8, 9, and 10, respectively). To use the fast find dropdown 810, the user selects the column/field against which to search. The user types in the keyword and clicks the Search link 820. As shown in FIG. 9, the user enters the term "Smith" in the last name field.

In accordance with some embodiments, the system returns all records that match the keyword entry. In the example provided, the system will then return all records where the last name contains the string 'Smith', as shown in FIG. 10. The result set is shown on page 1000. While only shown for names in this example, other 'Fast Find' options a user can use include: Title, Company, and Phone.

Referring now to FIG. 11, in accordance with an embodiment, a companies tab 1110 is shown. Companies tab 1110 is where company information is created, maintained, and stored. This is the source that feeds data into the people screen, shown on page 500. Companies tab 1110 default sort is by Company Name in ascending order. To resort this or any other column, the user clicks on the column header. Clicking once reverses the sort and clicking another time reverts back to its original sort.

Figure 12:
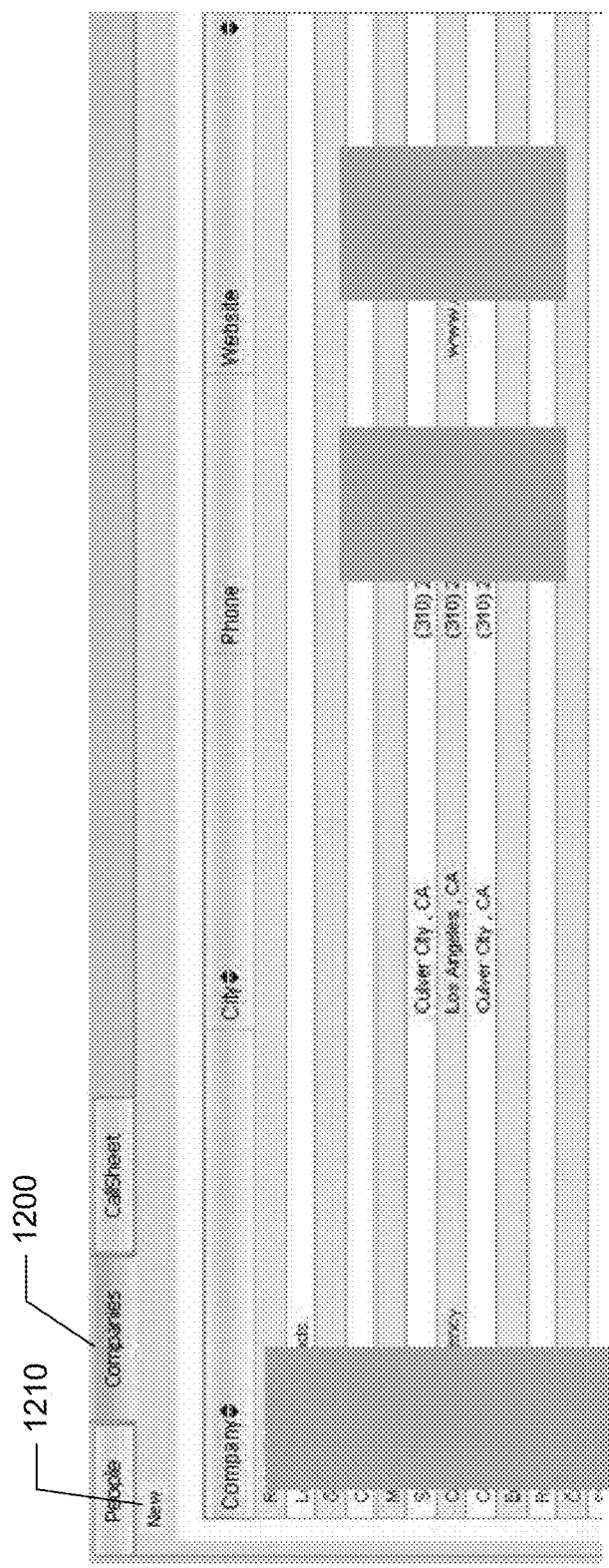
Figure 12A:
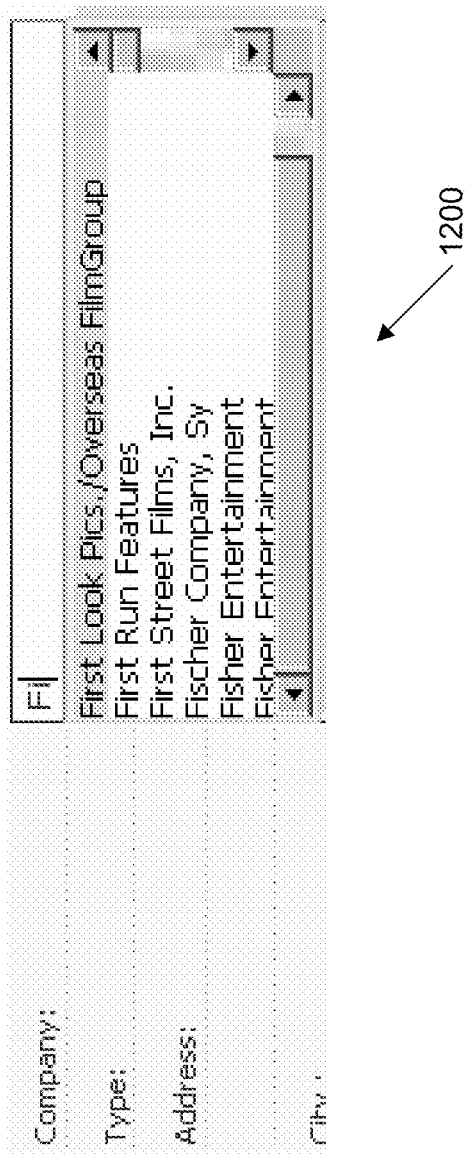

Referring now to FIGS. 12-15, in accordance with an embodiment, the creation of a new company record is shown. To create a new company record, the user clicks on the 'New' link 1210 located below the 'Companies' tab 1210 (See FIG. 12). A new record form 1220 displays and is ready for data entry (See FIG. 12A).

In one example, the user begins filling out the following input fields:

(1) Company: This is a type ahead field that allows the user to enter the first few characters and displays a list of close matches. The user may click to select the from within the choices displayed or type in a new one if it isn't presented as an option.

Figure 12B:
Figure 13:
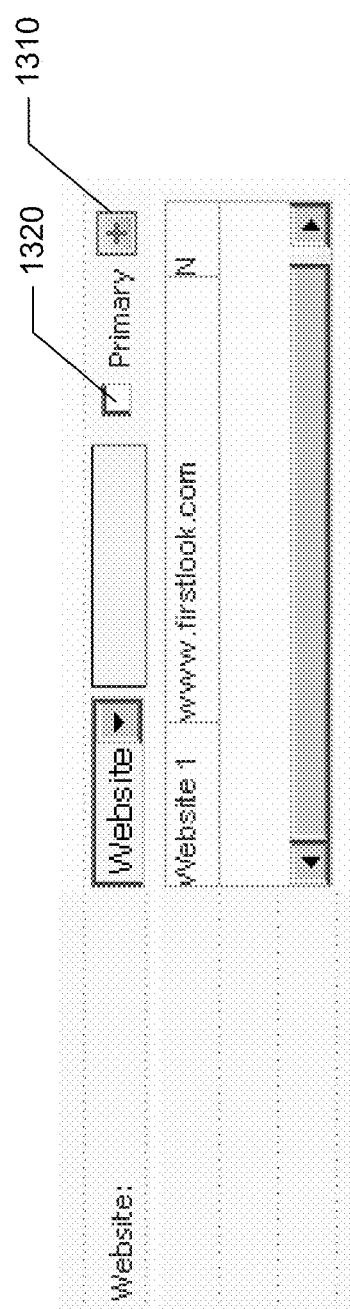
Figure 14:
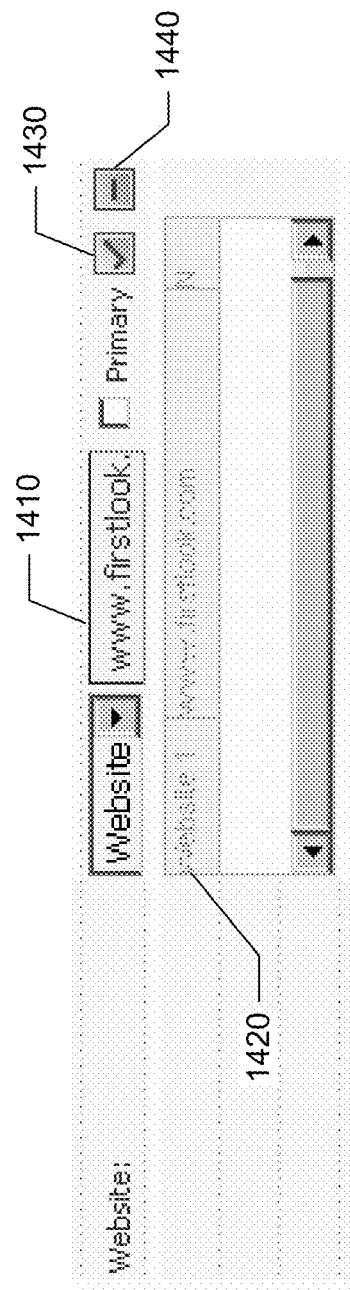
Figure 15:
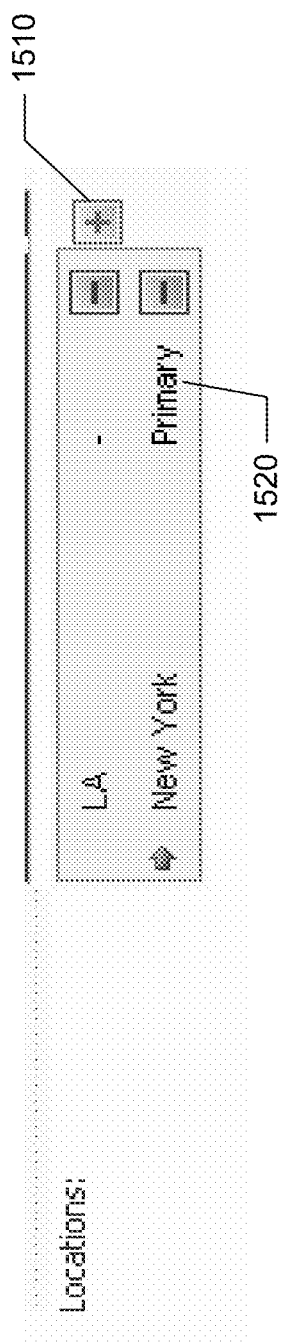

(2) Type: The user select a type from the Type dropdown. See one one example of a Type dropdown in FIG. 12B.

(3) Address: (Street Address, City, State, Zip, and Country)

(4) Website: The user makes his selection from the dropdown (e.g., Website 1, Website 2) shown in FIGS. 13-14, and enters the web address in the input field 1410. To add more entries, the user clicks on the plus sign 1310. The user uses the 'Primary' checkbox 1320 to indicate which one to use as the primary address. Once a website is added, it is displayed in a grid 1420 below the input field 1410. To make changes to any of the entries, the user clicks on the entry to change, makes the appropriate change, and clicks the check mark box 1430 to save the change. To delete, the user clicks to select the entry to delete and clicks on the minus sign box 1440.

(5) Occupation: The user selects an occupation from the dropdown list. In one implementation, this item is optional.

(6) Contacts: This works similar to the website selection entry. The user makes a selection from the dropdown (Home, Office, etc.) and enters the phone number in the input box. To add more entries, the user clicks on the plus sign. The user uses the 'Primary' checkbox to indicate which one to use as the primary contact number. Once added, it is displayed in a grid. To make changes to any of the entries, the user clicks on the entry to change, makes the appropriate change, and clicks the check mark box to save the change. To delete, the user clicks to select the entry to delete and clicks on the minus sign box.

(7) Upload Image: The user clicks on the 'Browse' button, selects an image to upload, and clicks on 'Open'.

(8) Save or Cancel: The user clicks the Save link 610 to save changes, or the Cancel link 620 to undo them.

(9) Locations: The first address the user enters for a company becomes its primary location, but the user may add more locations to a company, then define any one of them to be the primary location. The user can do the following to add more locations (see FIG. 15): (a) The user clicks on the plus sign box 1510 located next to the Locations box 1520; (b) The user fills out all necessary address, contact, and website information particular to the new location; and (c) The user clicks on the Save link 610 to save the changes.

In accordance with the synching function, new company records should reflect on the Mobile Device Application Module.

In an example embodiment, to edit an Existing Company Record, the user goes to the main Company screen on the Contacts tab, and scrolls to find a desired entry to edit. The user clicks on the company name to open up the record and clicks on the Edit link. The user makes the appropriate changes, and clicks on the Save link to save or on the Cancel link to undo the changes.

In accordance with the synching function, changes made to existing company records should reflect on the Mobile Device Application Module.

Figure 16:
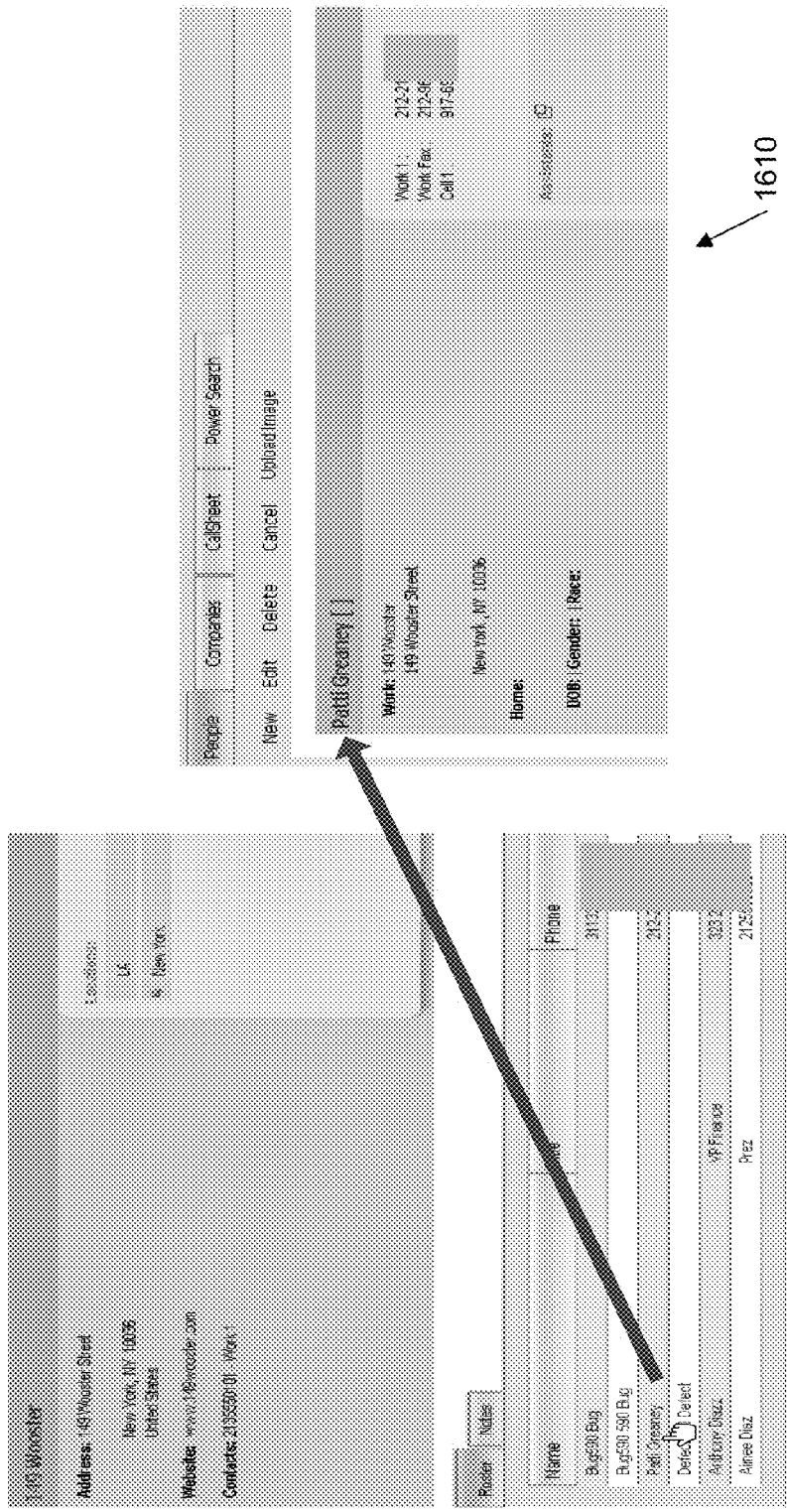

Turning now to FIG. 16, in accordance with an embodiment, a company's roster 1600 is shown. In one example, contacts tied to a company will display in that company's roster tab 1600. The user can click on any of the names to view the contact detail in the Contacts tab 1610.

Figure 17:
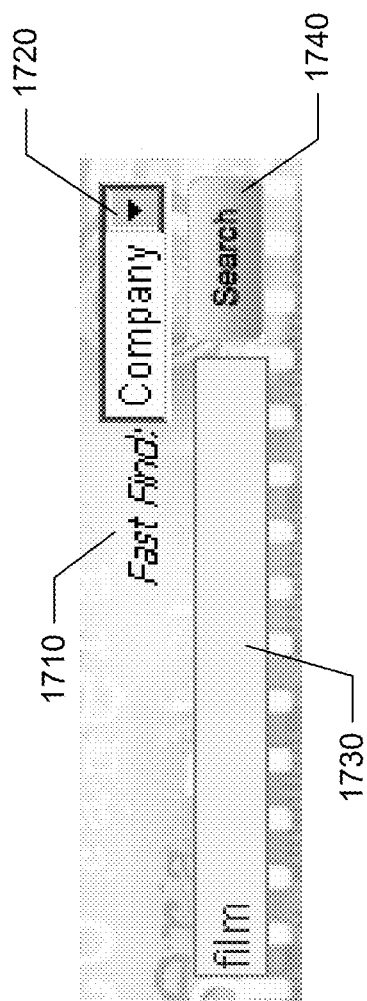
Figure 18:
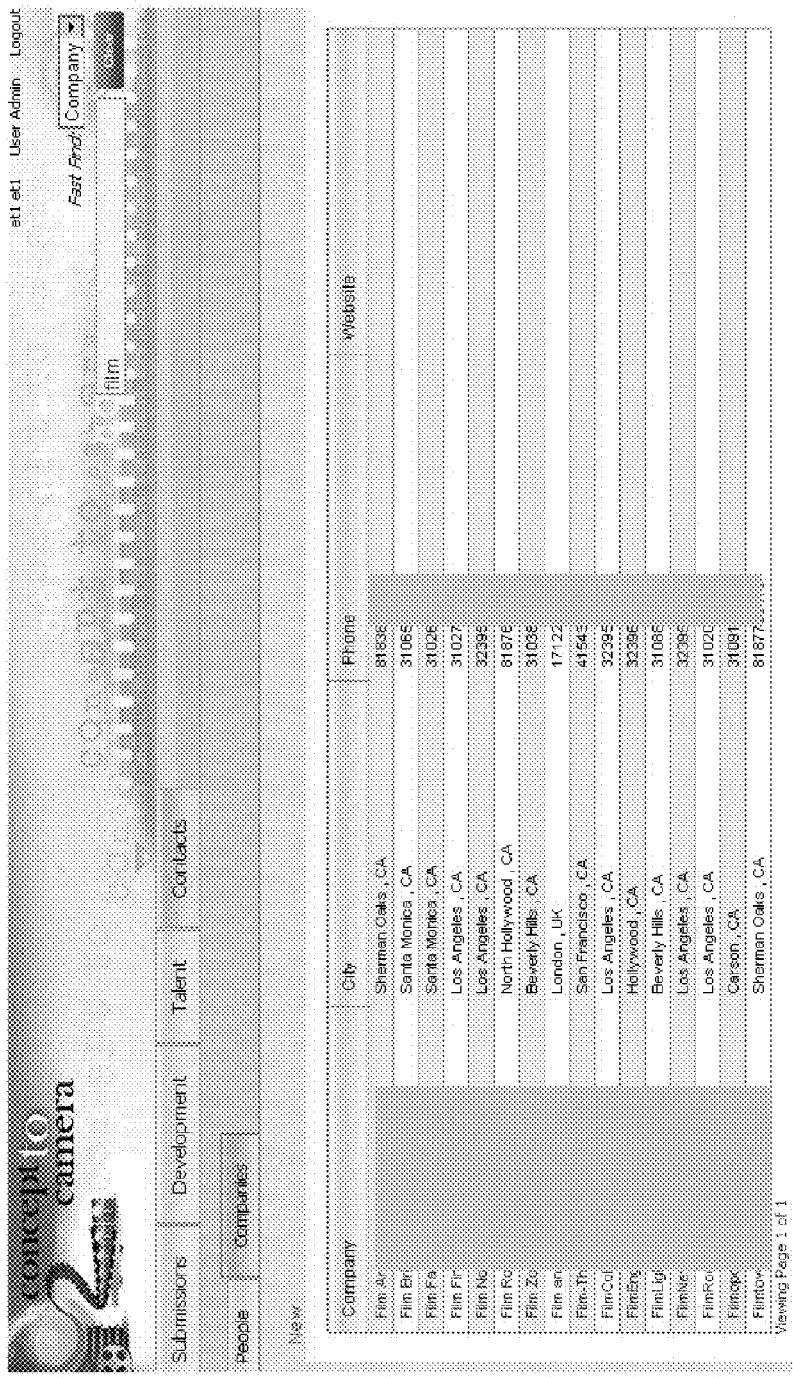

Turning now to FIGS. 17-18, in accordance with an embodiment, an example of using the fast find feature 1710 in the companies tab 1720 is shown. To use the feature 1710, the user selects the column/field to search against in the 'Fast Find' dropdown 1720. The user types in the keyword in the entry field 1730 and clicks on the search tab 1740.

As shown in FIG. 18, the system returns all records that match the keyword entry as page 1800. In the example above, the search keyword entered is 'film' and the Fast Find selection made is 'Company'. The system will then return all company records where the company name contains the word 'film'.

Callsheet Module

Turning now to FIG. 19, in accordance with an embodiment, an example callsheet tab 1900 and its associated information is shown. Callsheet tab 1900 contains callsheet entries created for any given executive. In some embodiments, records in this tab are also viewable in the executive's Mobile Device Application. This tab 1900 is accessible to the executive and to his/her assistant.

In one example, records are sorted according to priority, with 'NTC' or 'Next To Call' at the top of the list, followed by records with no indicated priority, followed by High, then Medium, then Low. Records in blue font may indicate outgoing calls, while those in red font may indicate incoming calls.

Figure 20:
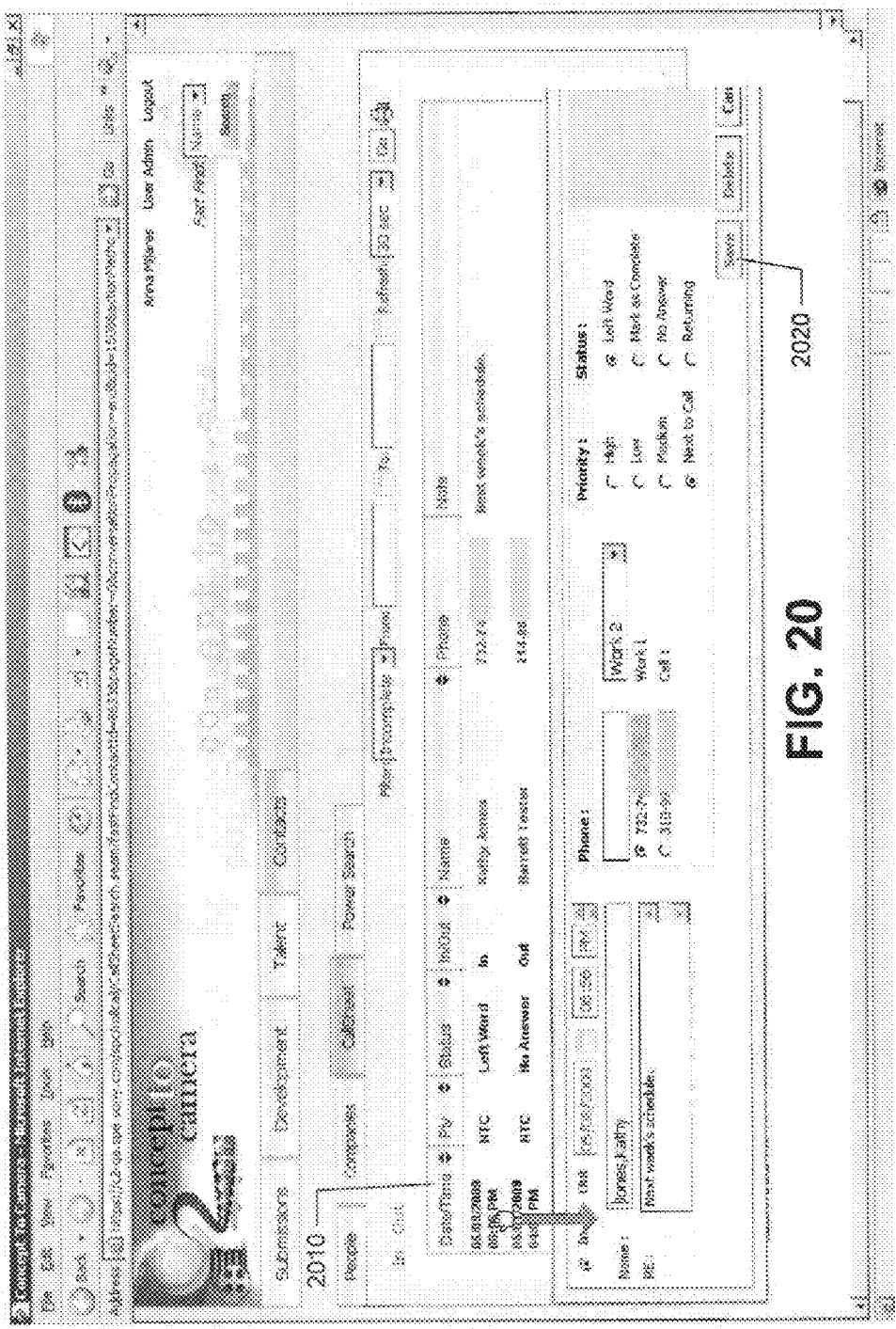

Turning now to FIG. 20, in accordance with an embodiment, an example callsheet record 2000 is shown. To view any callsheet record, the user clicks on the record's Date/Time link 2010. This brings up the record details, as shown. To make changes to existing records, the user opens the record and makes the appropriate changes. When done, the user clicks on the 'Save' button 2020.

In accordance with the synching function, changes made to existing callsheet records should reflect on the Mobile Device Application Module.

Turning now to FIGS. 21-25, in accordance with an embodiment, an example new callsheet record is shown. To create a new callsheet record, the user clicks the appropriate link to indicate whether the call is incoming ('In') 2110 or outgoing ('Out') 2120. The user enters the date and time as appropriate in the provided fields. In one example, these fields default to the current date and time.

Figure 22:
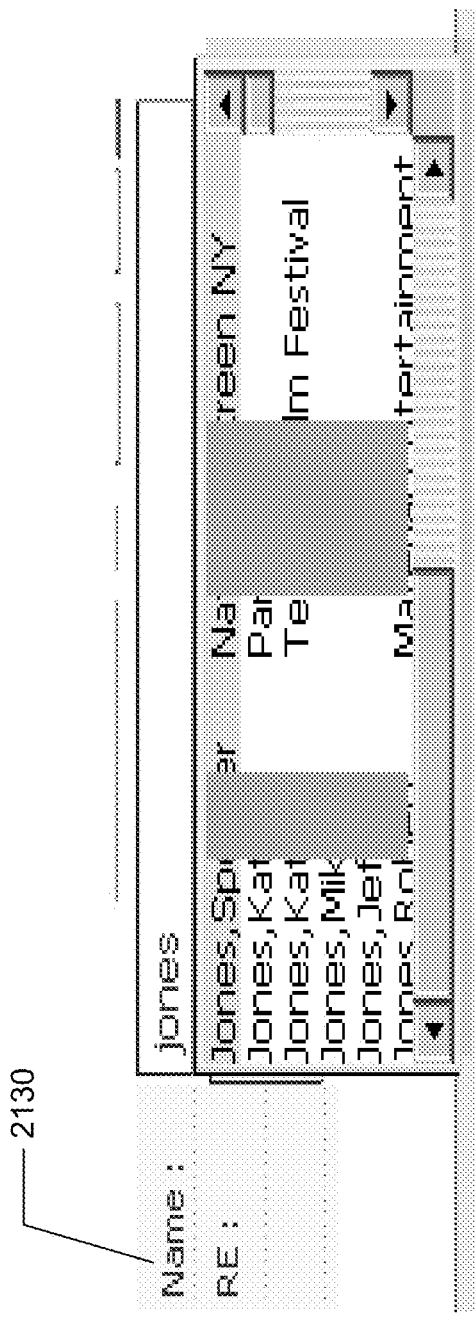

In the Name field 2130, the user types the first few characters of the caller's name, as shown in FIG. 22. In one example, this is a type-ahead field that will display names in the contact table that match the characters entered. The user clicks to select the desired name from the list, then hits tab.

Figure 23:
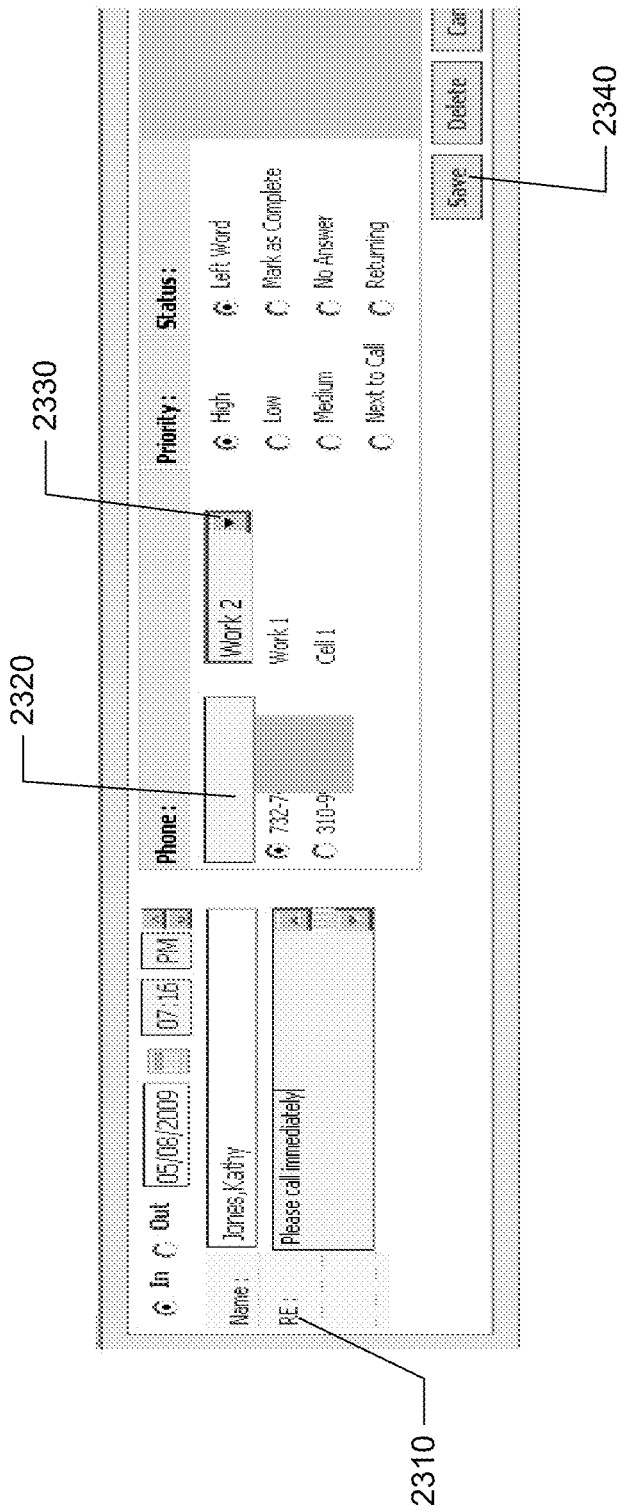

As shown in FIG. 23, the user marks the appropriate phone number, priority, and status selections, then enters any notes in the 'RE:' text box 2310. In some embodiments, the user may also type in a phone number in the 'Phone' box 2320 and select the appropriate phone number type from the phone number type dropdown menu 2330. When done, the user clicks the Save button 2340.

Figure 24:
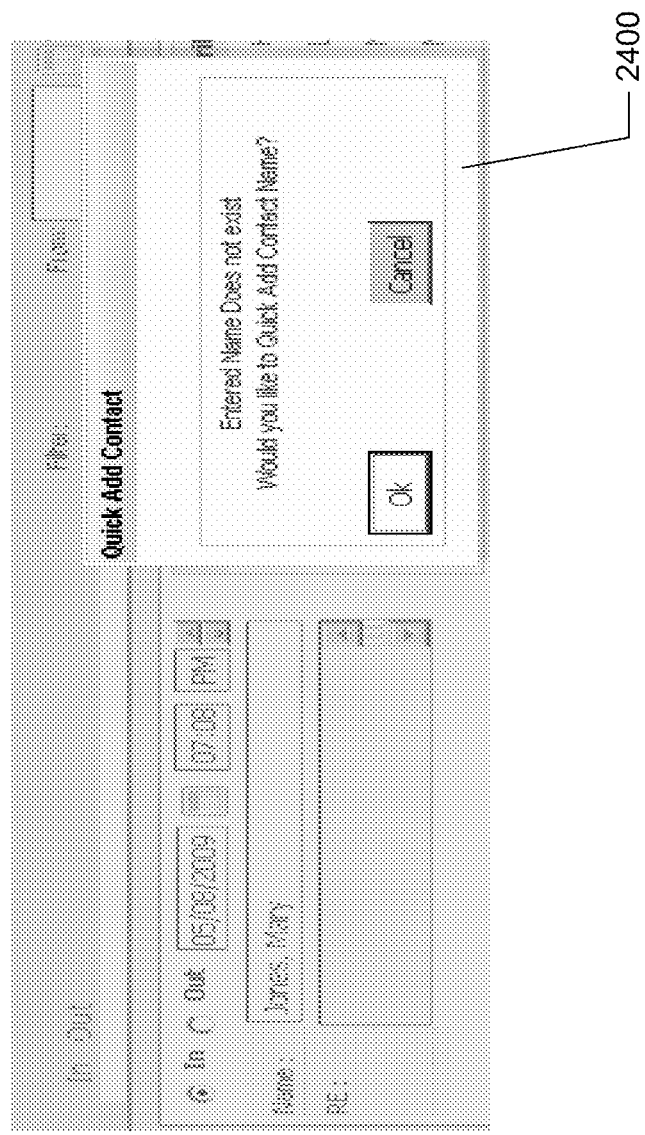
Figure 25:
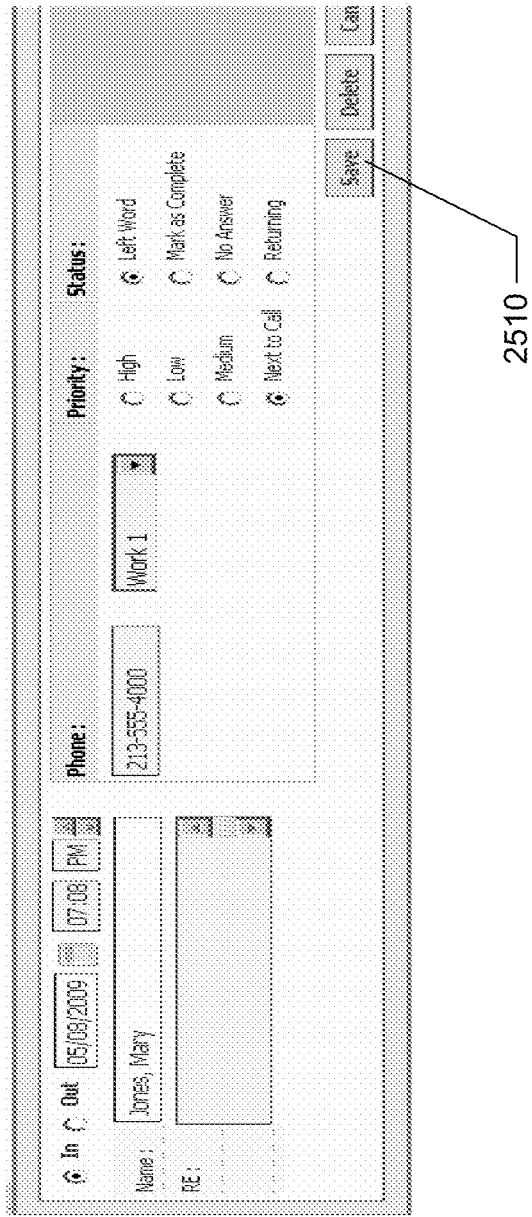

If none of the names in the contact table match the name entered, the user may hit Enter on keyboard to invoke the Quick Add feature 2400, shown on FIG. 24. This feature adds the user's contact to the contacts table. The user enters "OK" and then proceeds to enter the contact phone number, mark the appropriate Priority and Status selections, and enter any notes in the 'RE:' text box, as shown in FIG. 25. When done, the user clicks the Save button 2510.

Figure 26:
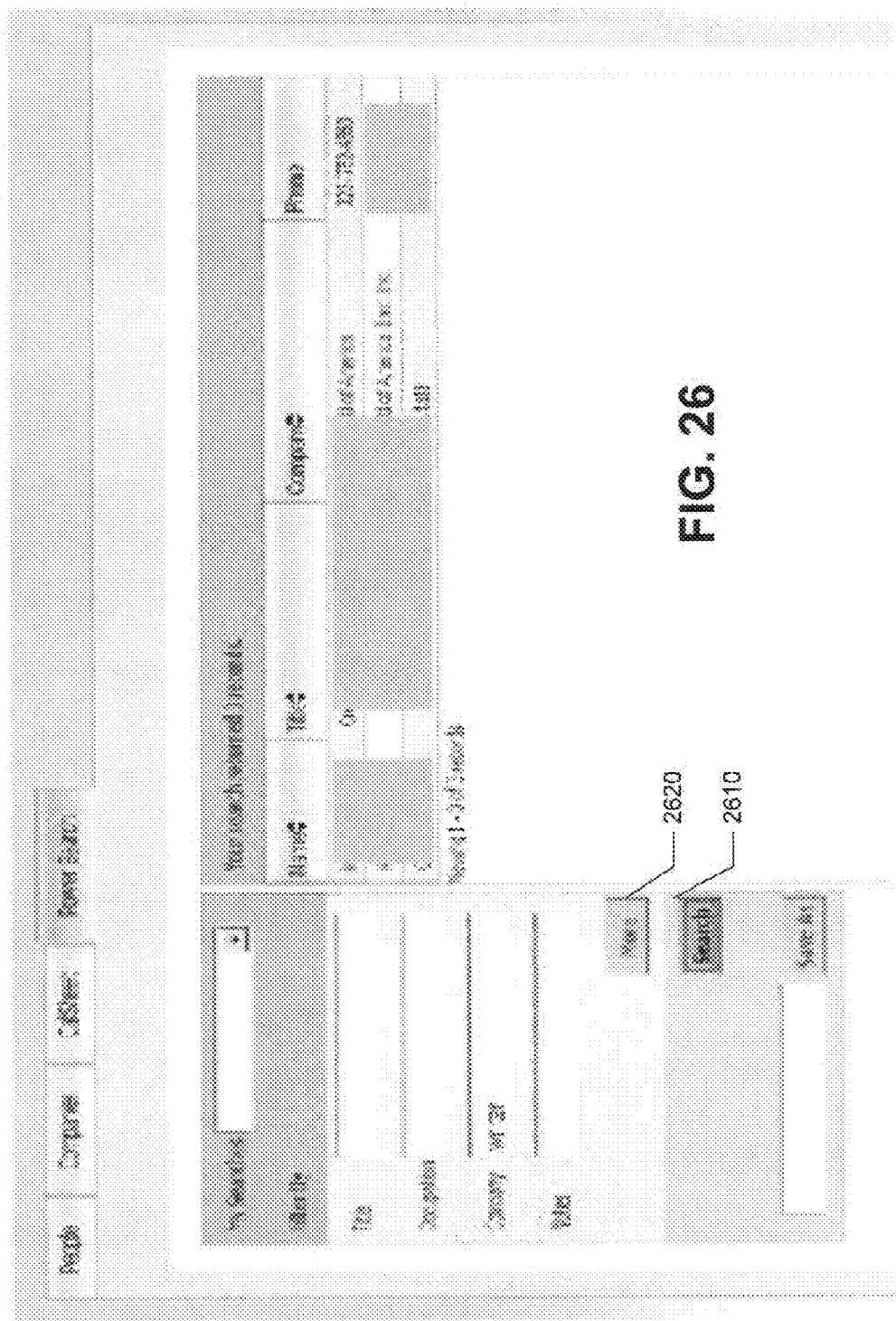
FIGS. 26-27 illustrate the ability to search the contacts database based on search criteria entered by a user.
Figure 27:
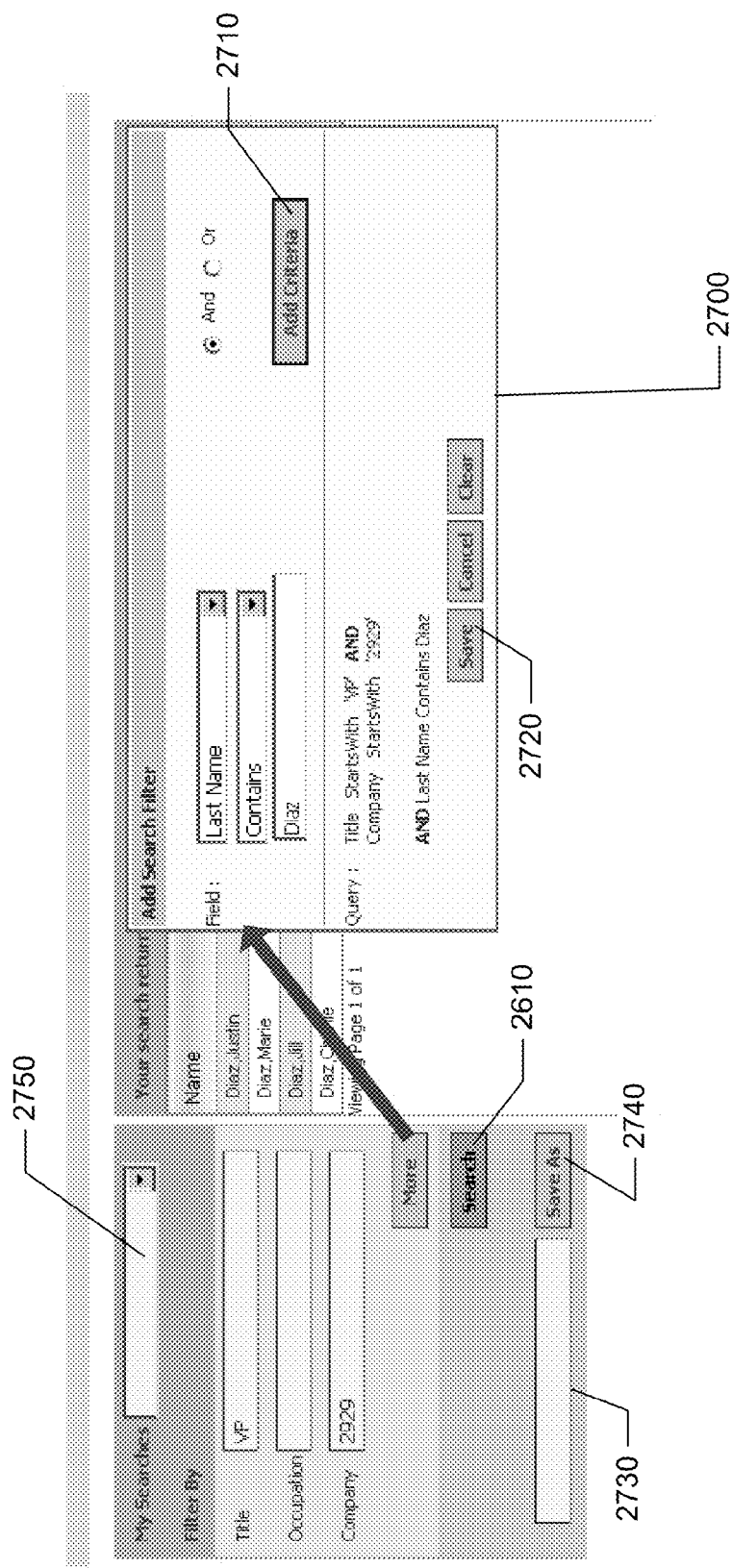

Turning now to FIGS. 26-27, in accordance with an embodiment, an example power search is shown. The Power Search (entered using Power Search tab 440 shown in FIG. 4) allows the user to search the contacts database using specified search criteria. To perform a 'simple' search, the user enters the desired search criteria in the Title, Occupation, and/or Company fields and clicks the Search button 2610. To perform a more "advanced" search, the user may append to the existing search criteria by clicking on the 'More' button 2620.

In response, an 'Add Search Filter' pop up 2700 displays, as shown in FIG. 27. The user makes the appropriate search criteria selections then clicks on the 'Add Criteria' button 2710. When done, the user clicks on the Save button 2720. The user may thereafter click on the Search button 2610 to apply the new search filters.

The user may save any search by typing in a name in the 'Save As' field 2730, then clicking on the 'Save As' button 2740. To call a previously saved search, the user clicks to expand the 'My Searches' dropdown 2750 and clicks to select the appropriate search.

Mobile Device Application Module

Figure 28:
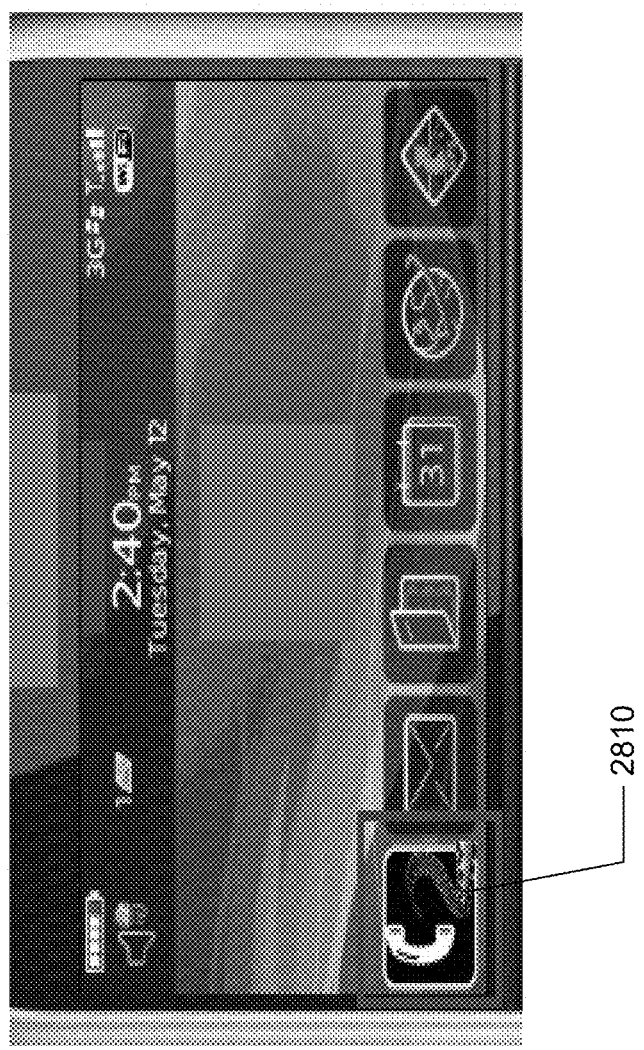
FIGS. 28-29, and 53 illustrate user interfaces (UIs) having a main page in a mobile device application module in accordance with implementations of the present invention.

In accordance with some embodiments, the Web Application Contacts and Callsheet Module(s) are also accessible on a mobile device such as a handheld device via a related Mobile Device Application Module. To access the Mobile Device Application Module, the user uses a trackball to navigate to the C2 icon 2810 as shown in FIG. 28.

Figure 29:
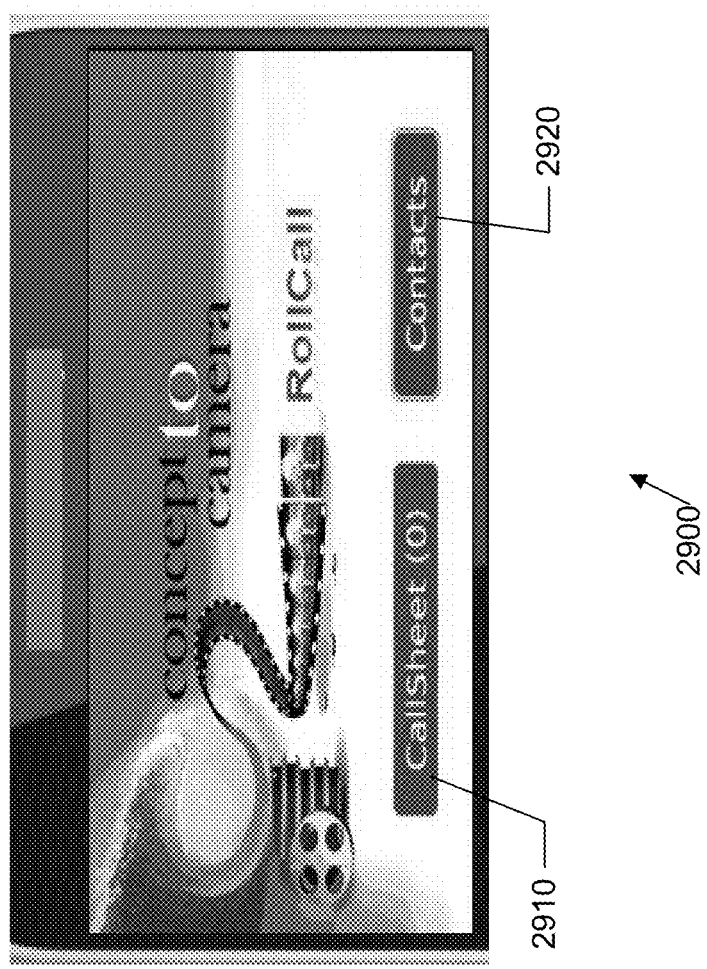

Clicking on the icon 2810 takes the user to the C2 for home screen 2900, shown on FIG. 29. Here, the user is presented with two modules: Callsheets 2910 and Contacts 2920. Accessing either module is done by using the trackback and clicking on the appropriate selection.

Contacts Module

Figure 30:
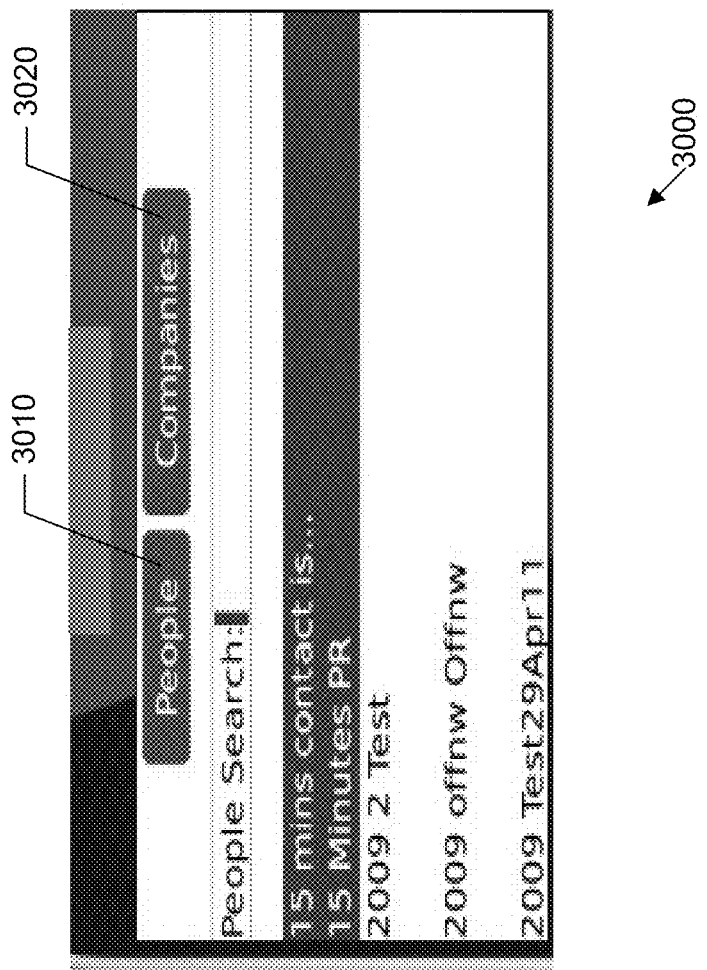
Figure 31:
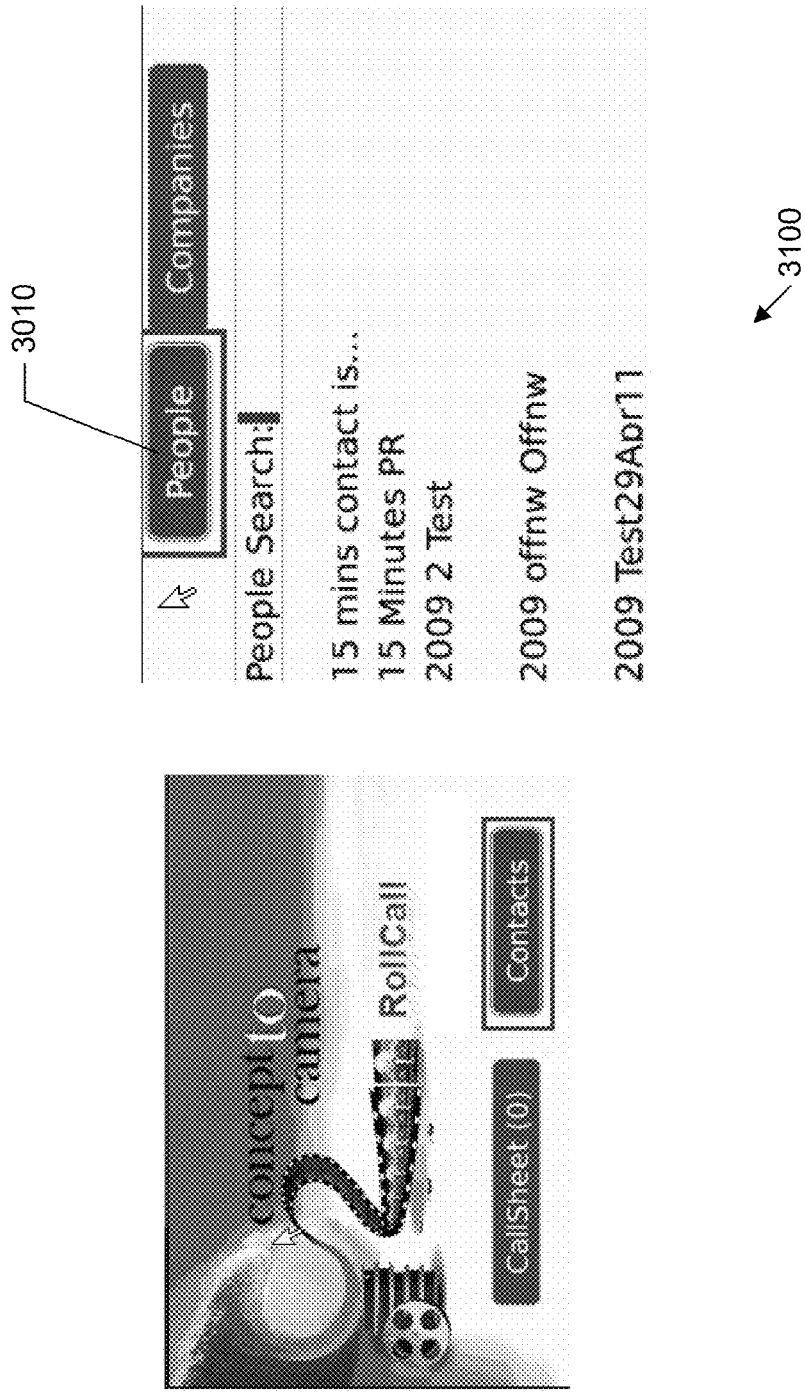

In a first example, the Contacts module is selected, so if the user were to click on the trackback, the user would be taken to the Contacts module. The Contacts module home screen 3000 for the C2 is shown in FIG. 30. There are two possible menu options to choose from: People 3010 or Companies 3020. By default, navigating to the Contacts home screen takes the user to the People Search screen 3100, shown in FIG. 31.

The 'People' submodule of the Contacts module is where people records are maintained. It is where new records are created, modified, or deleted. To get to the People submodule, a user navigates to Contacts screen 3000, then selects the 'People' tab 3010.

Figure 32:
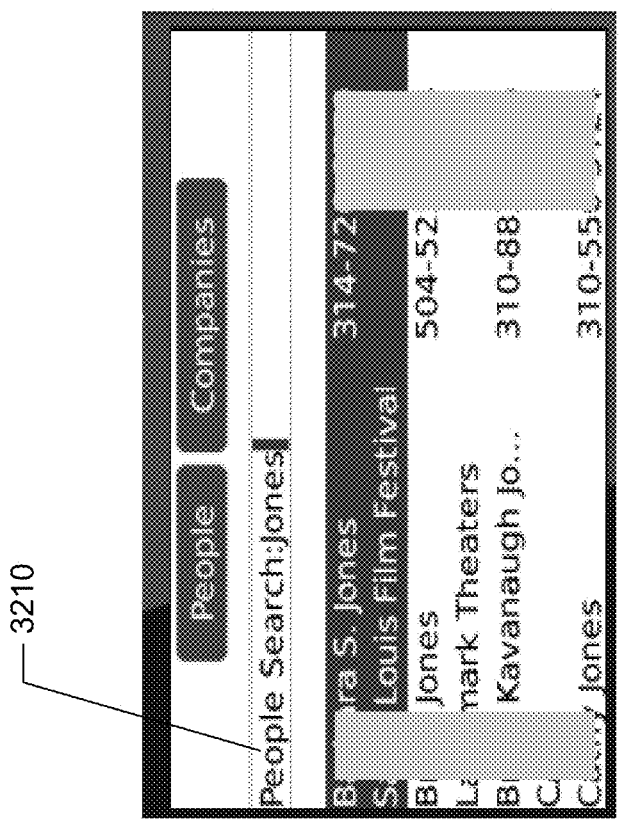

To search for a particular contact record, the user types in the contact's first or last name in the people search field 3210, shown in FIG. 32. Close matches may be displayed at the bottom of the screen.

In the present example, the search string entered is 'jones', so close match records returned are those where 'jones' is contained in the first or last name. See FIG. 32.

The user then uses the trackball to select the desired record, and clicks once to view the record.

Figure 33:
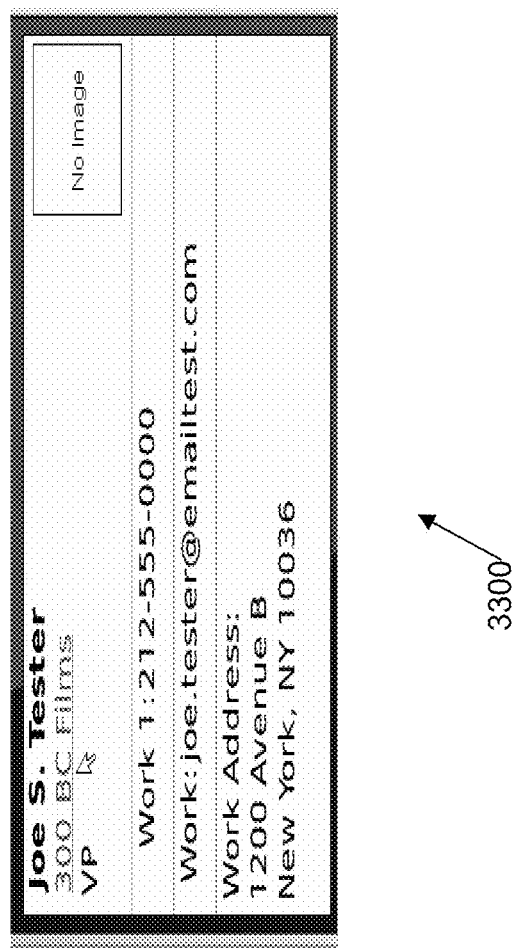

Turning to FIG. 33, in an embodiment, the contents of an example contact/people record 3300 is shown in view mode. The person's name is shown in the upper left hand corner, and the company this person is associated to displays just below the name. Any phone numbers, email addresses, work or home addresses would also display in this view if available on the record.

Turning now to FIG. 34, in accordance with an embodiment, a company hyperlink in a contact record is shown. For example, when a contact is tied to a particular company, the user can click on the company hyperlink 3410 to get to the company record 3420 in view mode. In the present example, the user can click on the company hyperlink '300 BC Films', which takes the user to the company record in view mode, shown on the right. The user can see that the contact 'Joe S. Tester' is on the company roster for this record.

Figure 35:
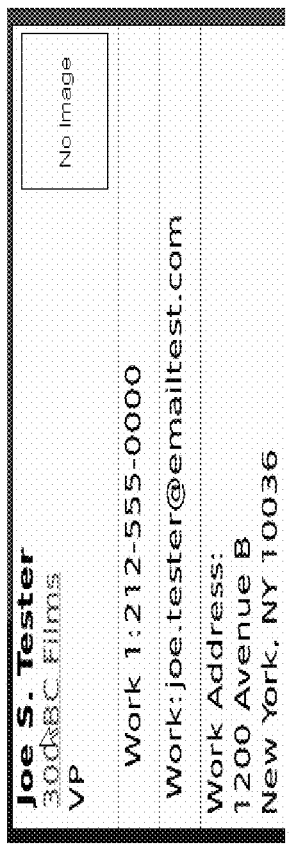
Figure 36:
Figure 37:
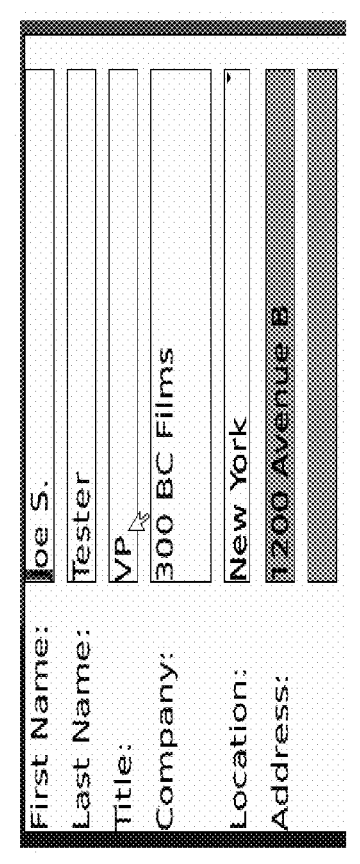
Figure 38:
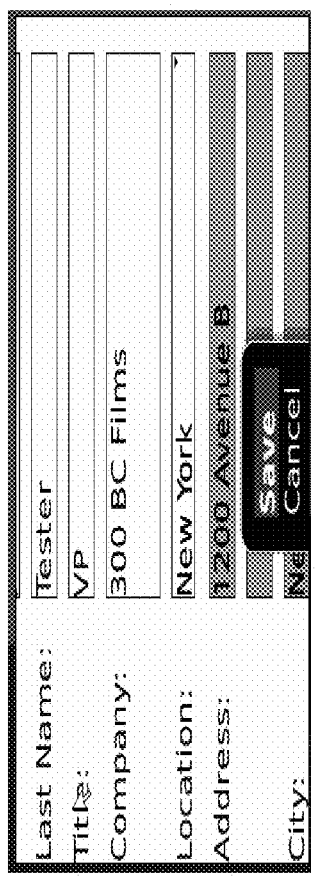
Figure 39:
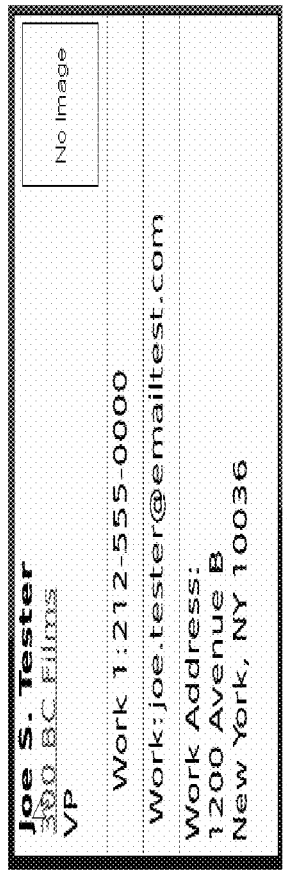
Figure 40:
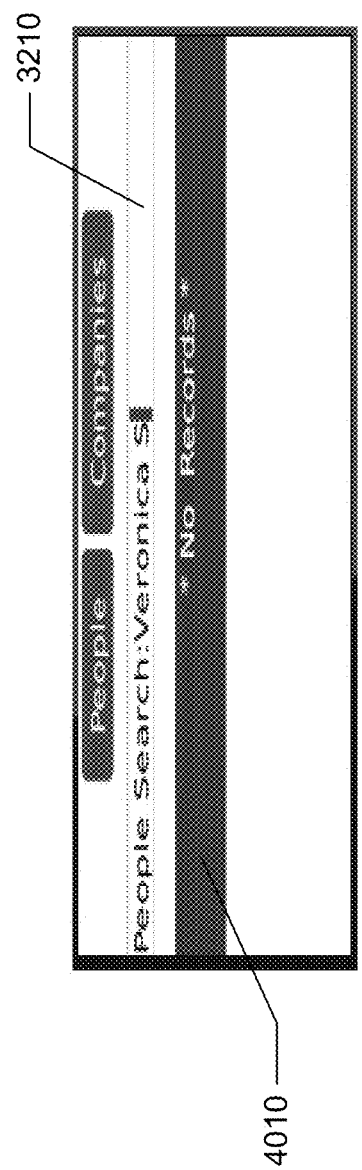

Turning now to FIGS. 35-39, in accordance with an embodiment, the editing of an existing contact record is shown. To edit a contact record, the user pulls up the record in view mode (FIG. 35). The user clicks the trackball to invoke the menu and selects 'Edit' (FIG. 36). The user is now in edit mode and makes the appropriate change(s) (FIG. 37). When done, the user clicks the trackball and selects 'Save' to save the change(s) (FIG. 38). The user is then taken back to view mode for the contact record just modified (FIG. 39).

In accordance with the synching function, changes to existing contact records from within the Mobile Device Application Module will trigger a 'synch' to corresponding records in the address book, the Web Application Contacts and/or Callsheet Module(s), and Outlook contacts of the user.

Referring now to FIGS. 40-44, in accordance with an embodiment, creating a new contact record is shown. To create a new contact record, in the people search field 3210, the user types in a contact's first and last names. If this contact does not already exist in C2 Contacts, the user should get a 'No Records' message 4010 as shown below in FIG. 40. The user then clicks the trackball to invoke the new contact record screen 4100 (shown in FIG. 41), and begins filling in the available information on the contact.

Figure 42:
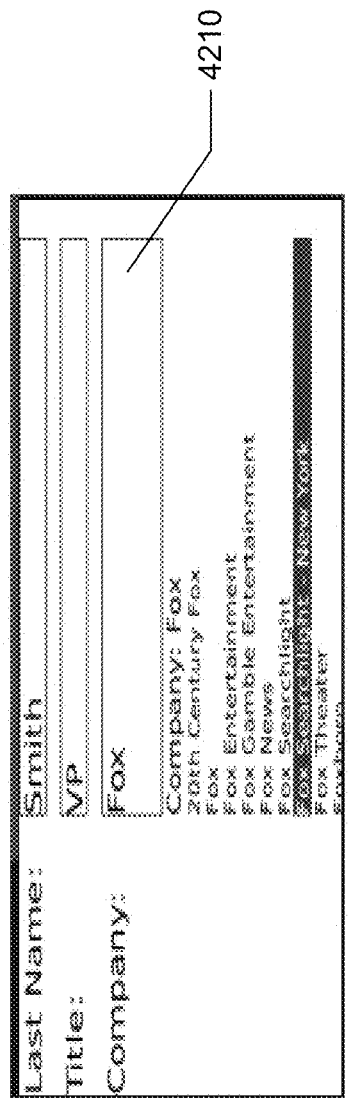
Figure 43:
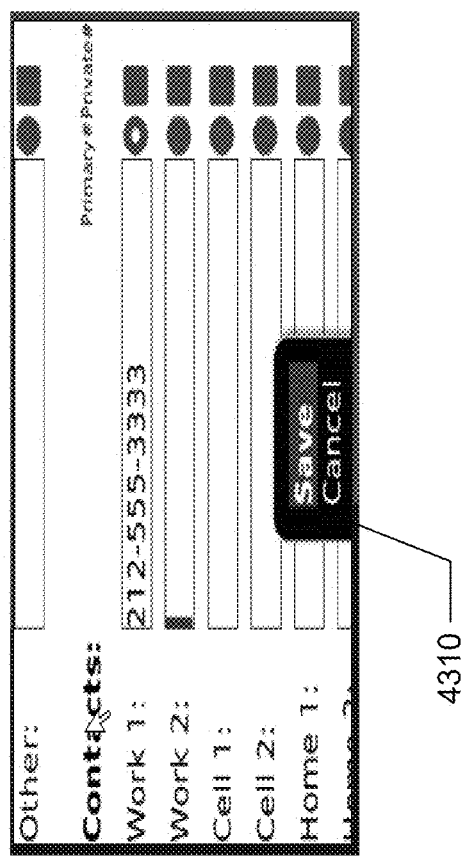
Figure 44:
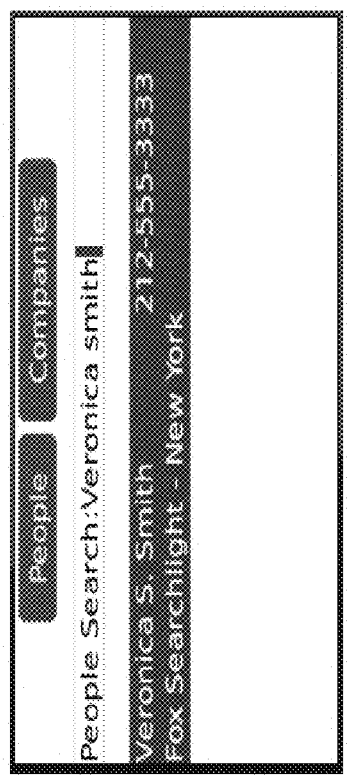

As shown in FIGS. 42-43, in one example, the Company field 4210 is a type-ahead field that allows the user to enter the first few characters of the company name, and any close matches will display at the bottom in a list format, which the user can then select from. The user fills in the company and all other relevant information (email, phone, etc.). When done, the user clicks the trackball and selects the 'Save' button 4310 to save the changes. The user is then taken back to the contact record in view mode (FIG. 44).

In accordance with the synching function, all new contact records from within the Mobile Device Application Module will trigger a 'synch' to corresponding records in the address book, the Web Application Contacts and/or Callsheet Module(s), and Outlook contacts of the user.

Figure 45:
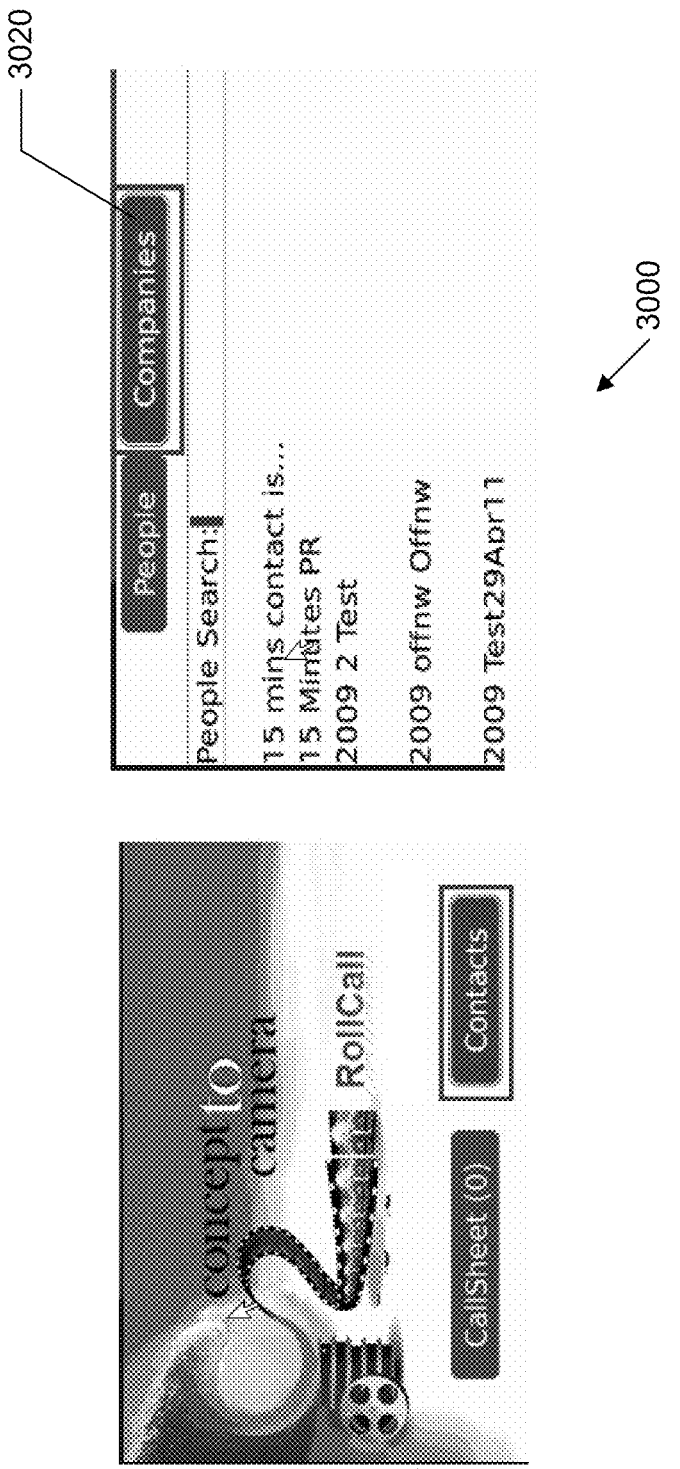

The 'Companies' submodule of the Contacts module is where company records are maintained. For example, the 'Companies' submodule is where new records are created, modified, or deleted. To access it, the user navigates to the 'Contacts' module 3000 and then select the 'Companies' submodule 3020 as shown in FIG. 45.

Figure 46:
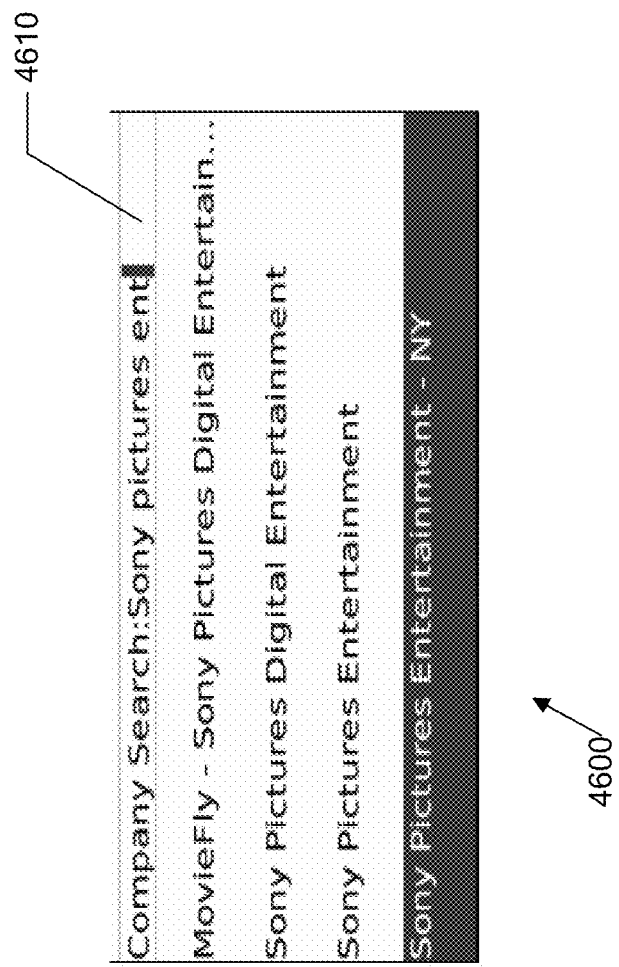

Referring now to FIG. 46, in accordance with an embodiment, searching for a company record is shown. To search for a particular record, the user types in the first few characters of the company name in the company search field 4610. Any close match records will display at the bottom of the screen 4600, which the user can scroll to and click his trackball to make a selection.

Figure 47:
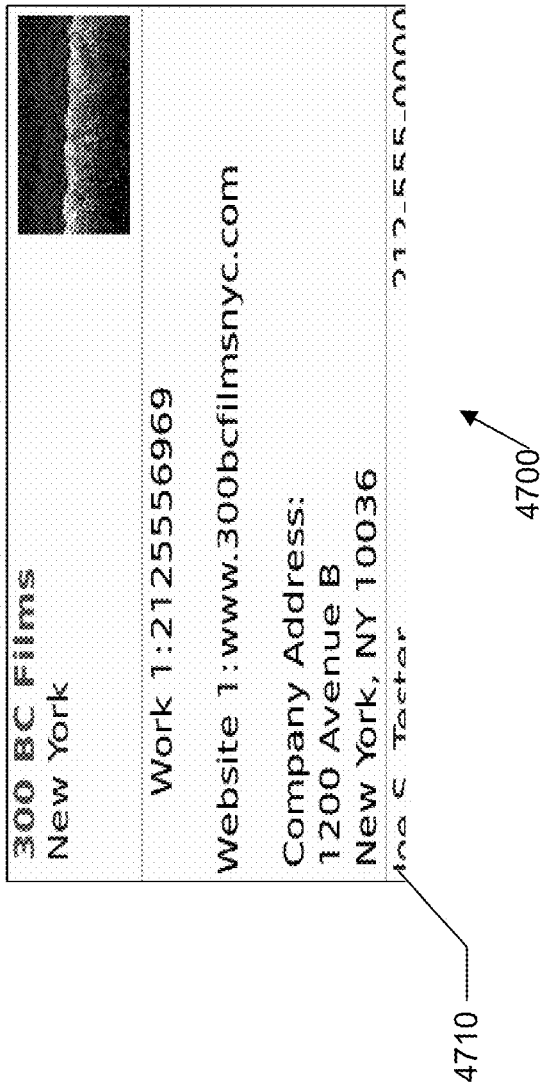

Referring now to FIG. 47, in accordance with an embodiment, viewing a company record is shown. For example, once selected, the company record 4700 in view mode displays as shown in FIG. 47. Any contacts tied to this company are displayed in the roster section 4710. In some embodiments, the user can click on the contact name hyperlink to see the contact record in view mode.

Figure 48:
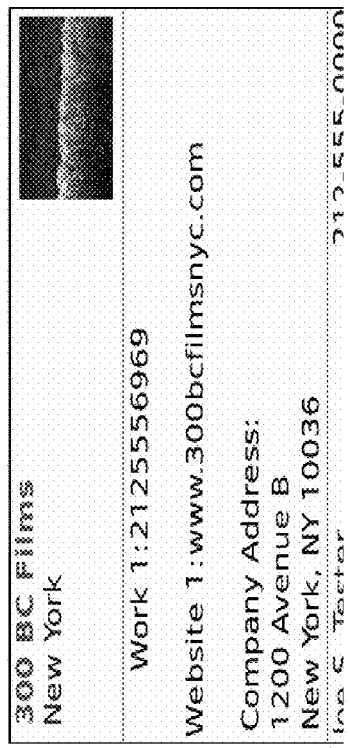
Figure 49:
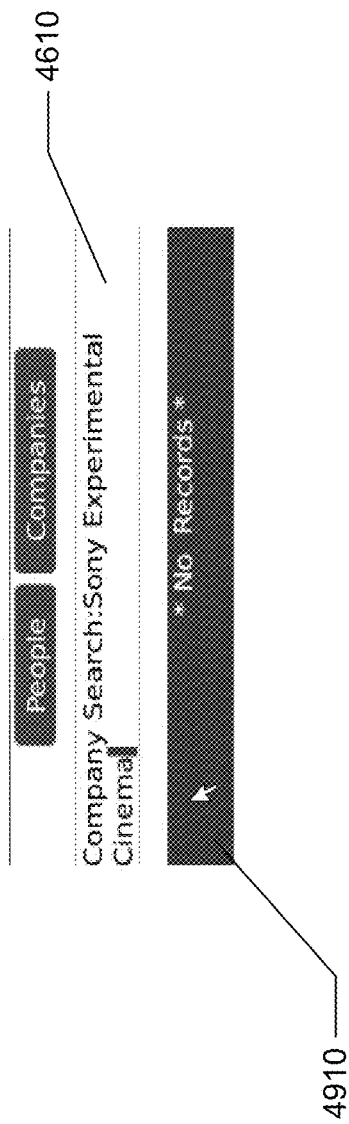

Referring now to FIG. 48, in accordance with an embodiment, editing an existing company record is shown. To edit a company record, the user pulls up the record 4800 in view mode. The user clicks his trackball to invoke the menu and selects 'Edit'. The user is now in edit mode and may make the appropriate change(s). When done, the user clicks the trackball and selects 'Save' to save the change(s). Thereafter, the user is taken back to view mode for the company record just modified.

In accordance with the synching function, changes made to existing company records from within the Mobile Device Application Module will trigger a 'synch' to corresponding records in the Web Application Contacts and/or Callsheet Module(s).

Referring now to FIGS. 49-52, in accordance with an embodiment, creating a new company record is shown. To create a new company record, the user types in the company name in the company search field 4610. If this contact does not already exist in C2 Contacts (e.g., the Mobile Device Application Module), the user should get a 'No Records' message 4910.

Figure 50:
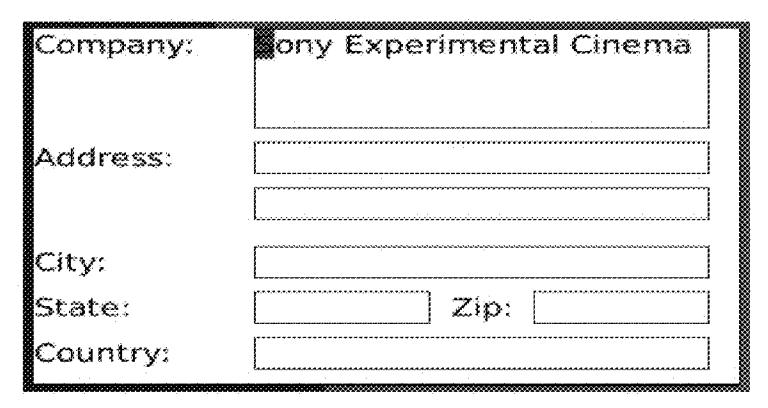
Figure 51:
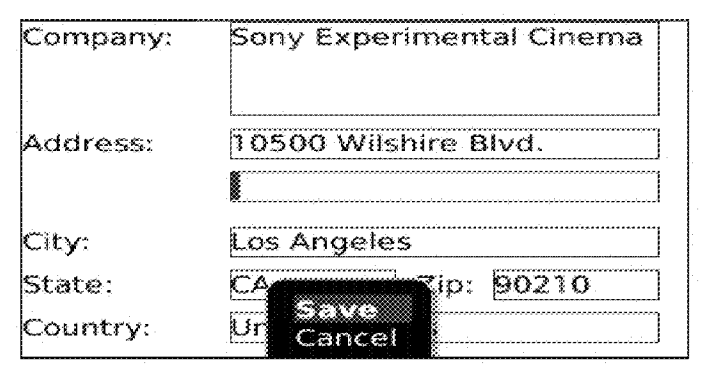
Figure 52:
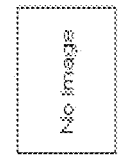

The user clicks his trackball to invoke the new company record screen, and begins filling in the available information on that company (FIG. 50). When done, the user clicks his trackball and selects 'Save' to save the changes (FIG. 51). Thereafter, the user is taken back to the company record in view mode (FIG. 52).

In accordance with the synching function, all new company records added from within the Mobile Device Application Module will trigger a 'synch' to corresponding records in the Web Application Contacts and/or Callsheet Module(s).

Callsheet Module

Figure 53:
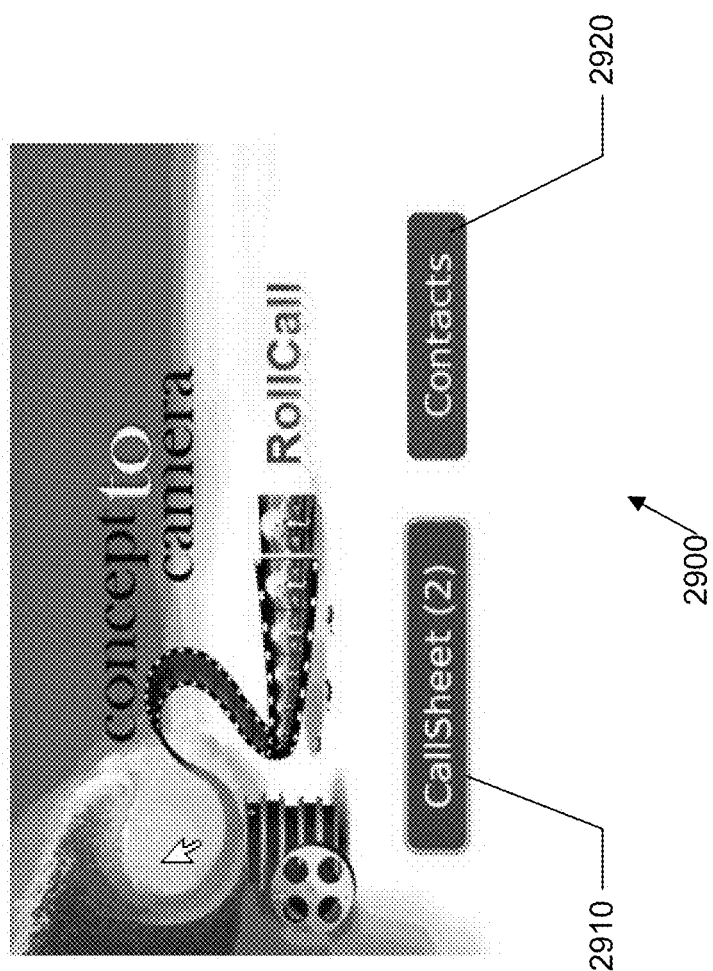

In an example, the Callsheet module allows the user to access his callsheet records. To access this module, the user clicks on the Callsheet menu option 2910 from the home screen 2900. In some embodiments, the number displayed in parenthesis [e.g., of Callsheet (2)] indicate the total number of outstanding callsheet records in the user's queue. For example, in FIG. 53, there are a total of two outstanding callsheet entries in the user's callsheet queue.

Figure 54:
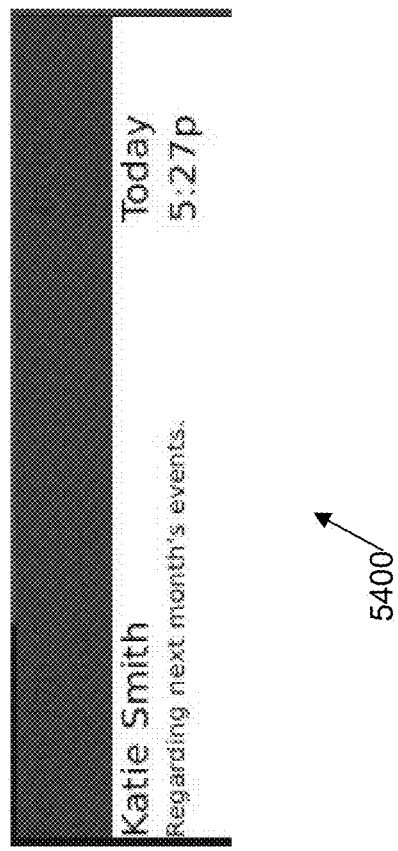
FIGS. 54-60 illustrate various user interfaces (UIs) for creating/editing callsheets in the mobile device application module in accordance with implementations of the present invention.

Referring now to FIG. 54, in accordance with an embodiment, viewing existing callsheet records is shown. Callsheets entered from the Web Application Callsheet Module are reflected on the C2 Callsheet module. To view these and all other callsheet records, the user clicks on the 'Callsheet' button from the C2 home screen. The user is then taken to the callsheet list view 5400 as shown in FIG. 54.

Top entries (in one color) indicate incoming phone calls, while bottom entries (in another color) indicate outgoing phone calls. Sorting may be similar to the sort order on the corresponding Web Application (e.g, by Priority: Next To Calls are listed first, followed by callsheet records with no priority, followed by highs, then mediums, then lows).

Figure 55:
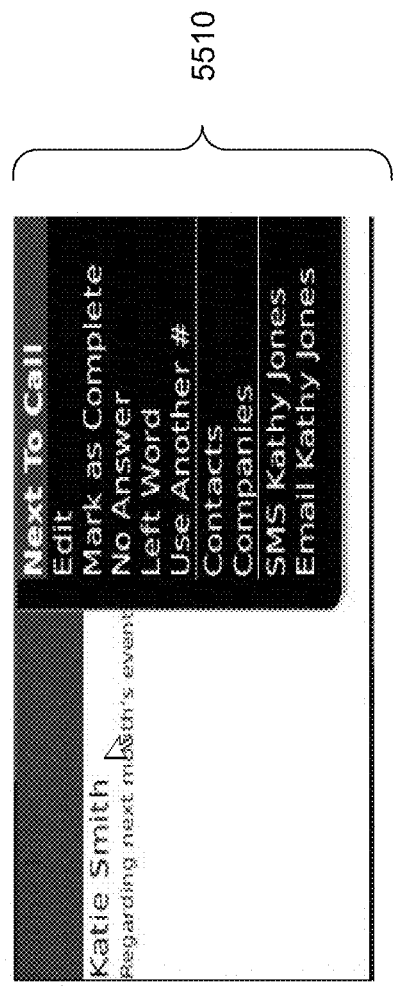

Referring now to FIG. 55, in accordance with some embodiments, Callsheet Record Menu Options 5510 are shown. For example, there are several menu options that allow a user to perform certain actions on the callsheet without actually opening the record. These options include: (1) Next To Call: marks the record's priority to 'Next To Call'; (2) Mark as Complete: marks the records status to 'Complete', which will cause the record to drop off from the callsheet list view. Note that this can still be accessed from the Roll Call web app by filtering on 'All' callsheet records; (3) No Answer: marks the status to 'No Answer'; (4) Left Word: marks the status to 'Left Word'; (5) Use Another #: pulls the phone numbers for that contact and allows user to select which phone number to dial; (6) Contacts: takes the user to the Contacts module; (7) Companies: takes the user to the Companies module; (8) SMS Contact Name: allows the user to send SMS text messages to the contact using the contact's phone number as stored on the contact record; and (9) Email Contact Name: allows the user to send emails to the contact using the contact's email address as stored on the contact record.

Figure 56:
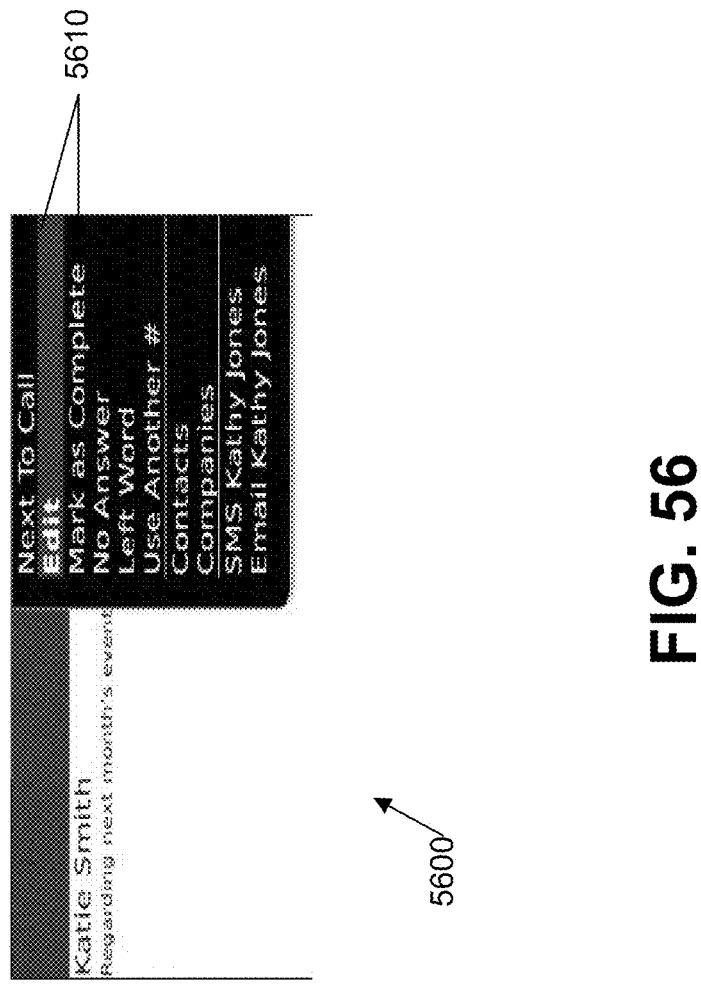
Figure 57:
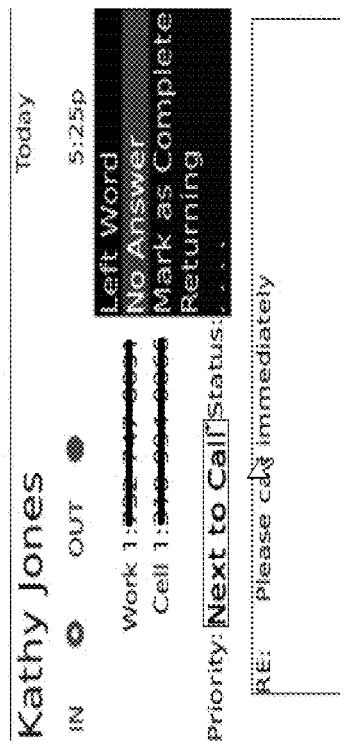
Figure 58:
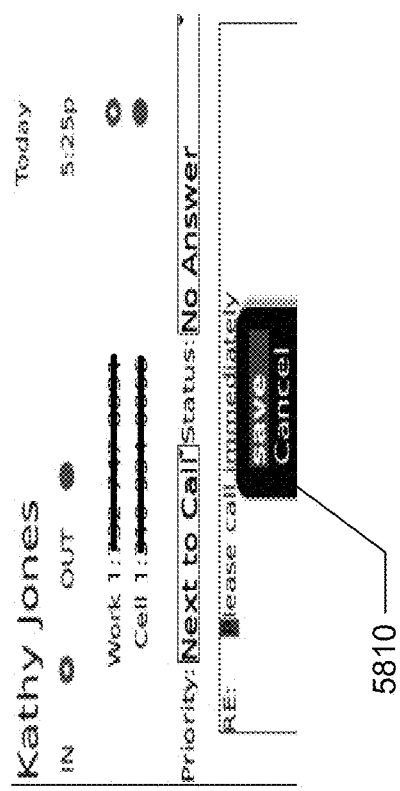

Referring now to FIGS. 56-58, in accordance with some embodiments, editing existing callsheet records is shown. To edit an existing callsheet record, the user highlights the record to edit in the callsheet list view 5600. The user clicks his trackball, and select the 'Edit' option 5610. Once in edit mode, the user makes the appropriate modifications, as shown in FIG. 57. Once all changes are made, the user clicks the trackball and selects the Save option 5810 (FIG. 58).

In accordance with the synching function, changes made to existing callsheet records from within the Mobile Device Application Module will trigger a 'synch' to corresponding records in the Web Application Contacts and/or Callsheet Module(s).

Figure 59:
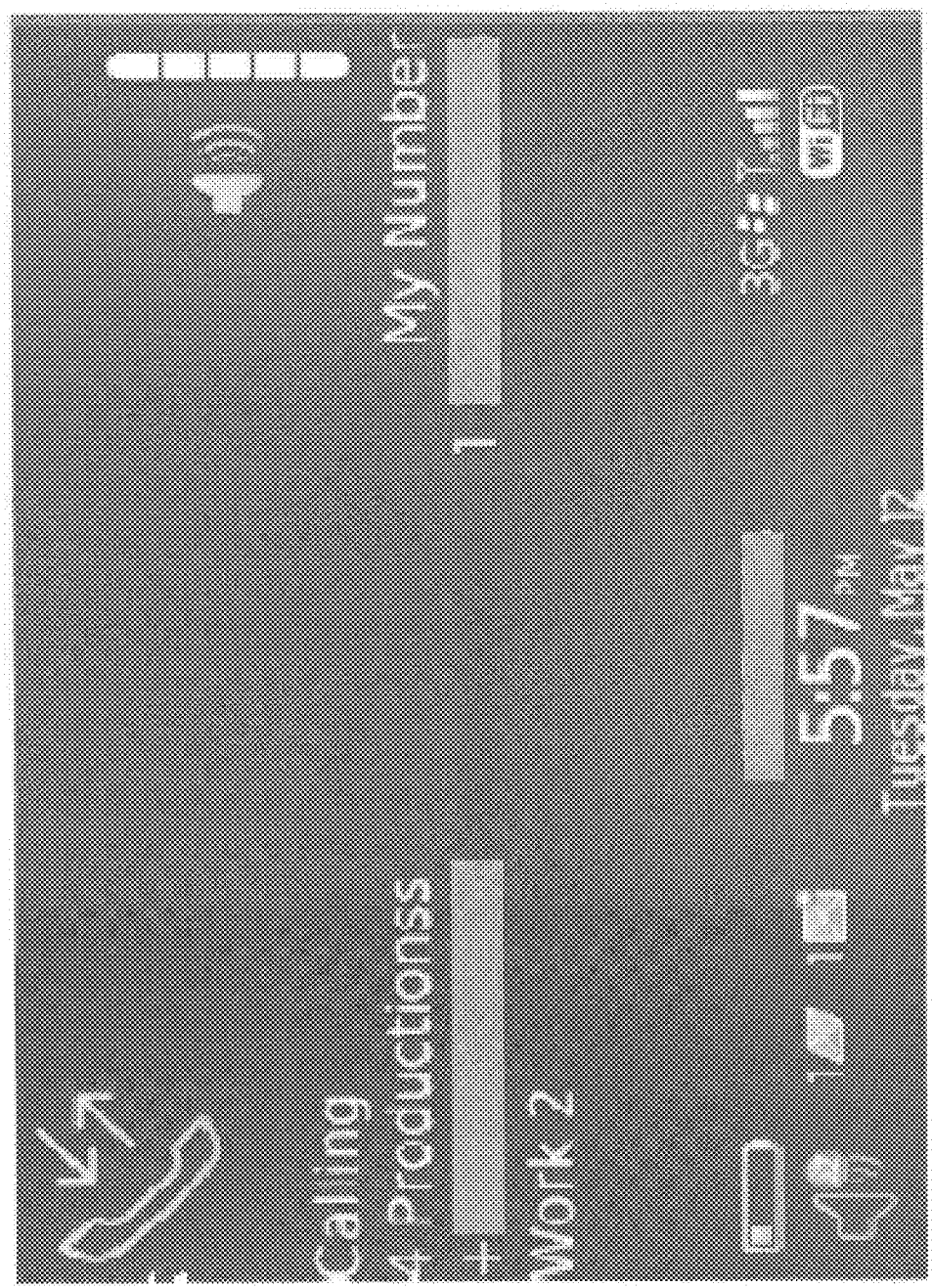
Figure 60:
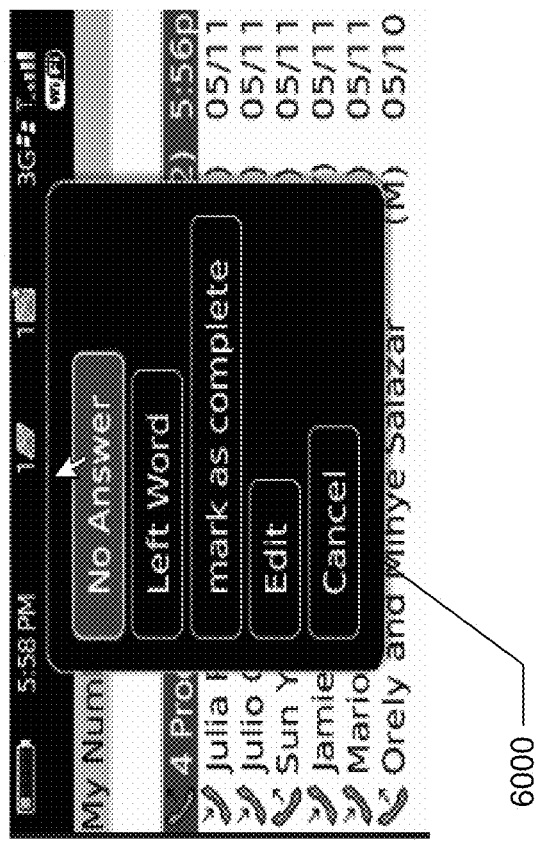

Turning now to FIGS. 59-60, in accordance with some embodiments, creating new callsheet records is shown. For example, when either an incoming or outgoing call is made to a contact that exists in the C2 contacts table (of the Mobile Application), then upon termination of the call, a prompt is displayed that allows the user the option of creating a new callsheet record.

In an example, a call is made to a phone number that exists in the C2 contacts table. See FIG. 59.

Upon terminating the call, a prompt 6000 is displayed (FIG. 60). The user may select 'No Answer', 'Left Word', or 'Mark As Complete' to create a new callsheet record. The user then Selects 'Edit' to create a new callsheet entry and make further changes to the record. The user selects 'Cancel' if the user does not wish to create a callsheet entry.

In accordance with the synching function, any new callsheet records created from within the Mobile Device Application Module will trigger a 'synch' to corresponding records in the Web Application Contacts and/or Callsheet Module(s).

Example of Contact Management

Figure 61:
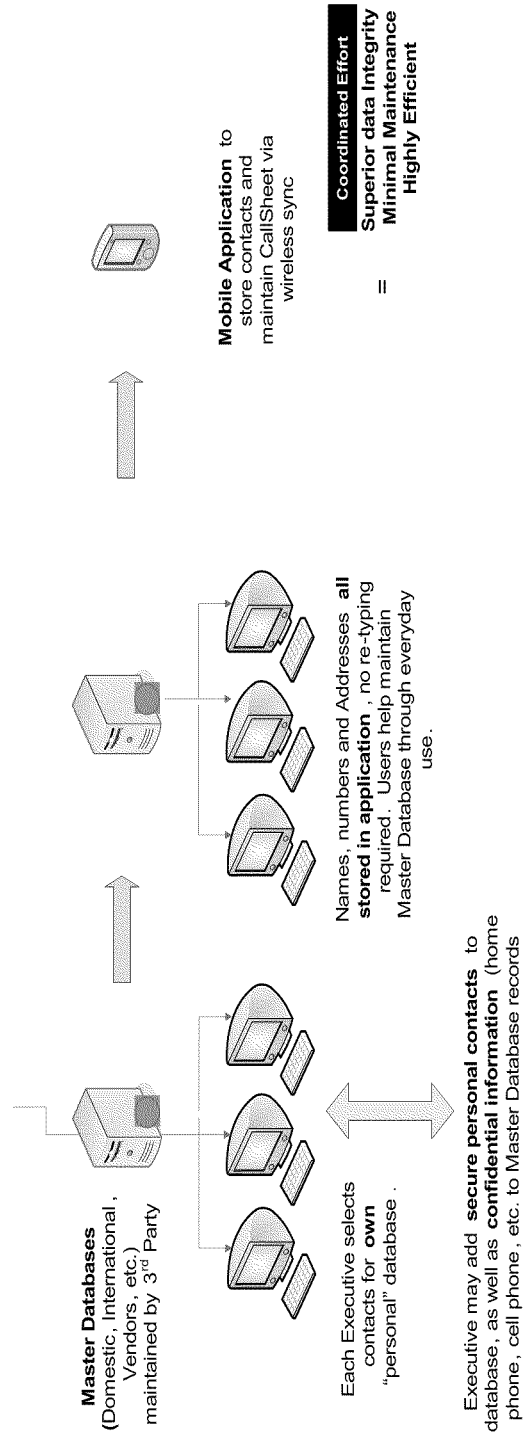
FIG. 61 shows an example scenario illustrating contact management and access in accordance with implementations of the present invention.

Turning now to FIG. 61, an example scenario illustrating contact management and access is presented. In a first step, a user administrator assigns a first executive ("Executive-1") and a first assistant ("Assistant-1") full access to a first database ("Database-1").

Assistant-1 maintains contact information for Executive-1 from the web component (of the contact management system) that is stored in a first database ("Database-1"), designating phone numbers for several contacts as private. Executive-1 is able to access all contact information within Database-1 from a smartphone device real-time.

In a second step, the user administrator assigns a second executive ("Executive-2") and a second assistant ("Assistant-2") full access to a second database ("Database-2") and view access to Database-1.

Executive-2 and Assistant-2 maintain and access contact information for Database-2 from the web component (of the contact management system). Both Executive-2 and Assistant-2 are only able to view the non-private contact information in Database-1.

Example of Call Management

Figure 62:
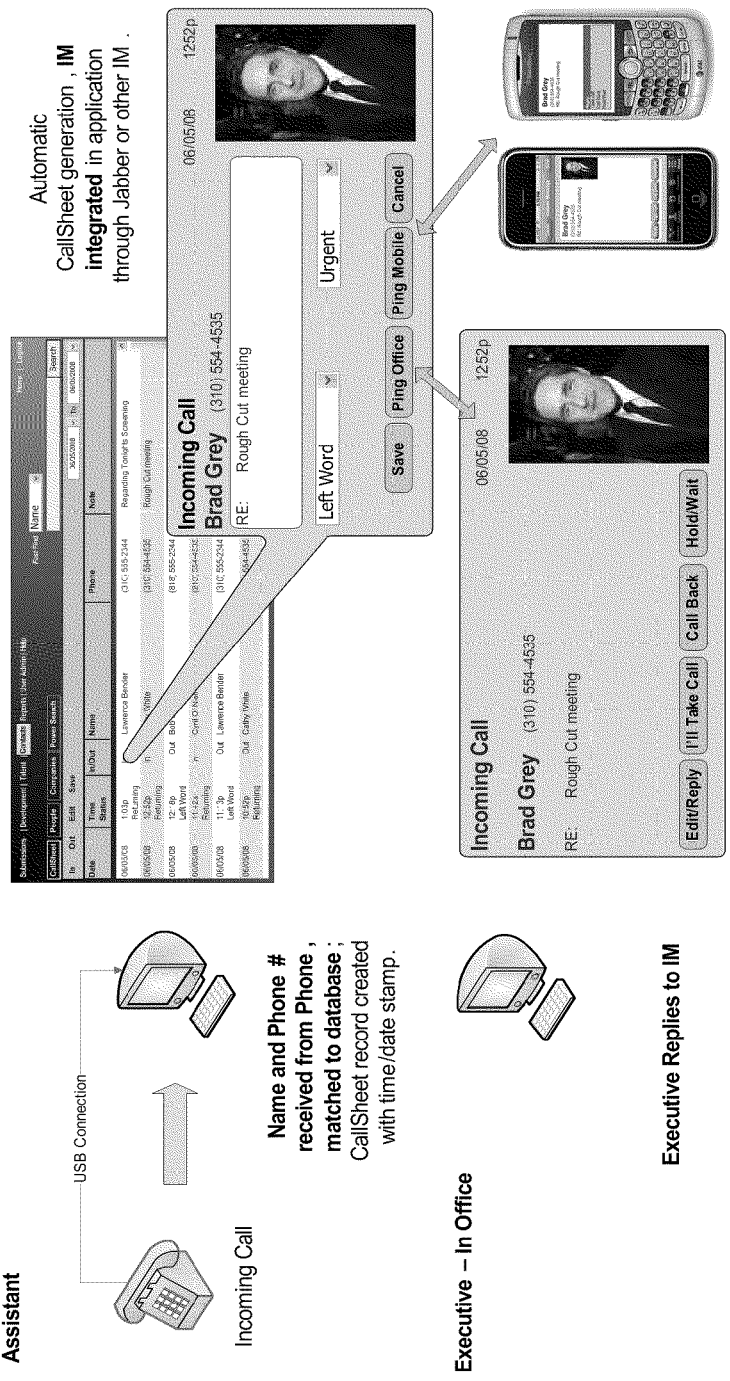
FIG. 62 shows an example scenario illustrating callsheet management and access in accordance with implementations of the present invention.

Turning now to FIG. 62, an example scenario illustrating call management is presented. In a first step, Executive-1 and Assistant-1 have full access to Database-1. A VoIP phone is connected to Assistant-1's desktop in the office. The phone application is active on Assistant-1's screen.

In a second step, a first contact ("Contact-1") calls the office number of Executive-1. Contact-1's contact information is displayed on Assistant-1's desktop via a pop-up screen, with options for Assistant-1 to ping Executive-1 via an instant messenger client or smartphone.

In an third step, Assistant-1 chooses the smartphone option and types a note to Executive-1 into the pop-up screen with notes about the call. The resultant pop-up screen is displayed on Executive-1's smartphone, with options to call Contact-1 back or immediately take the call on the smartphone.

In a fourth step, Executive-1 chooses to call Contact-1 at a later time. The call is logged into the Callsheet module (described below) and will serve as a reminder for Executive-1 to respond to Contact-1's call.

Various implementations are or can be implemented primarily in hardware using, for example, components such as application specific integrated circuits ("ASICs"), or field programmable gate arrays ("FPGAs"). Implementations of a hardware statistice machine capable of performing the functions described herein will also be apparent to those skilled in the relevant art. Various implementations may also be implemented using a combination of both hardware and software.

Furthermore, those of skill in the art will appreciate that the various illustrative logical blocks, modules, connectors, data paths, circuits, and method steps described in connection with the above described figures and the implementations disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description.

Specific functions or steps can be moved from one module, block or circuit to another without departing from the invention.

Moreover, the various illustrative logical blocks, modules, connectors, data paths, circuits, and method steps described in connection with the implementations disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or statistice machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the implementations disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. A storage medium can be coupled to the processor such that the processor can read information from, and write information to, the storage medium. In the alternative, the storage medium can be integral to the processor. The processor and the storage medium can also reside in an ASIC.

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. Thus, it is to be understood that the description and drawings presented herein represent a presently preferred implementation of the invention and are therefore representative of the subject matter which is broadly contemplated by the present invention. It is further understood that the scope of the present invention fully encompasses other implementations that may become obvious to those skilled in the art and that the scope of the present invention is accordingly limited by nothing other than the appended claims.

What is claimed is:

1. A contact management method comprising:
    receiving contact information into a storage device of a computer in communication with a central database;
    transferring the contact information in the storage device of the computer to the central database; and
    enabling a user of a mobile device to access the contact information in the central database, synchronize the contact information in the central database with contact information in the mobile device, and make modifications to the contact information,
    wherein the contact information on the mobile device and in the storage device of the computer is periodically synchronized with the contact information in the central database so that the modifications made on the mobile device are saved in the central database.

2. The method of claim 1, wherein enabling access to the contact information includes
    providing a contact management module on the mobile device that is related to a contact management system integral to the computer.

3. The method of claim 1, wherein the user of the mobile device has less than full access to all contact information in the central database.

4. The method of claim 1, further comprising:
    placing or receiving a phone call by the user of the mobile device,
    wherein the phone call prompts a call log to appear, the call log including a phone number placed or received; and
    adding information to the call log by the user of the mobile device.

5. A computer-readable storage medium storing a computer program for accessing contact information on a central database, the program comprising executable instructions that cause a processor on a mobile device to:
    access the contact information on the central database over a wireless network;
    perform one or more modifications to contact information on the mobile device; and
    transmit any modifications made to the contact information on the mobile device to the central database to synchronized the contact information on the central database with the modified contact information on the mobile device.

6. The computer-readable storage medium of claim 5, further comprising executable instructions that cause a processor on a mobile device to:
   create a call log in response to an incoming or outgoing call on the mobile device; and
   add information to the call log.

7. The computer-readable storage medium of claim 6, further comprising executable instructions that cause a processor on a mobile device to
   transmit the call log and call log information to the central database.

8. An information management system comprising:
   a mobile device configured to communicate with a central database storing contact and call log information, wherein the mobile device includes a contact management module that interfaces with a wireless network to allow a user of the mobile device to access and modify contact and call log information in the central database,
   wherein the modification of the contact and call log information in the central database by the mobile device enables other devices in communication with the central database to update the contact and call log information of the other devices.

9. The system of claim 8, wherein the contact management module provides synchronization of the contact and call log information of the mobile device with the contact and call log information in the central database.

\* \* \* \* \*